US010893295B2

(12) United States Patent
Jung et al.

(10) Patent No.: US 10,893,295 B2
(45) Date of Patent: Jan. 12, 2021

(54) MULTI-VIEW CODING AND DECODING

(71) Applicant: ORANGE, Paris (FR)

(72) Inventors: Joel Jung, Le Mesnil Saint Denis (FR); Antoine Dricot, Lisbona (PT)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/766,992

(22) PCT Filed: Sep. 29, 2016

(86) PCT No.: PCT/FR2016/052475
§ 371 (c)(1),
(2) Date: Apr. 9, 2018

(87) PCT Pub. No.: WO2017/060587
PCT Pub. Date: Apr. 13, 2017

(65) Prior Publication Data
US 2018/0302648 A1    Oct. 18, 2018

(30) Foreign Application Priority Data

Oct. 8, 2015  (FR) ..................................... 15 59592

(51) Int. Cl.
*H04N 19/597*     (2014.01)
*H04N 19/105*     (2014.01)
(Continued)

(52) U.S. Cl.
CPC ......... *H04N 19/597* (2014.11); *H04N 19/105* (2014.11); *H04N 19/137* (2014.11); *H04N 19/172* (2014.11)

(58) Field of Classification Search
CPC .... H04N 19/176; H04N 19/70; H04N 19/597; H04N 19/61; H04N 19/46; H04N 19/105; H04N 19/30; H04N 19/187
See application file for complete search history.

(56) References Cited

U.S. PATENT DOCUMENTS

2007/0121722 A1   5/2007  Martinian et al.
2014/0341292 A1*  11/2014 Schwarz .............. H04N 19/597
                                                       375/240.16

FOREIGN PATENT DOCUMENTS

WO    2008084443 A1    7/2008
WO    2014166096 A1    10/2014

OTHER PUBLICATIONS

International Search Report dated Nov. 23, 2016 for corresponding International Application No. PCT/FR2016/052475, filed Sep. 29, 2016.

(Continued)

*Primary Examiner* — Farhan Mahmud
(74) *Attorney, Agent, or Firm* — David D. Brush; Westman, Champlin & Koehler, P.A.

(57) ABSTRACT

A method and apparatus for decoding a current view belonging to a previously coded multi-view image. The method includes: determining, in a set of views belonging to the multi-view image or to another multi-view image, a pathway of views that are necessary for the decoding of the current view, the pathway comprising at least one as yet undecoded view; decoding the at least one view not yet decoded; and decoding the current view on the basis of a set of coded data representative of at least one difference between the current view and another view of the multi-view image or of another multi-view image, and of the at least one decoded view.

13 Claims, 18 Drawing Sheets

(51) Int. Cl.
*H04N 19/172* (2014.01)
*H04N 19/137* (2014.01)

(56) References Cited

OTHER PUBLICATIONS

Written Opinion of the International Searching Authority dated Nov. 23, 2016 for corresponding International Application No. PCT/FR2016/052475, filed Sep. 29, 2016.
English translation of the Written Opinion of the International Searching Authority dated Nov. 23, 2016 for corresponding International Application No. PCT/FR2016/052475, filed Sep. 29, 2016.
G.J. Han et al., "Overview of the High Efficiency Video Coding (HEVC) Standard", IEEE Transactions on Circuits and Systems for Video Technology, Jan. 1, 2012 (Jan. 1, 2012), pp. 1-1, XP055045358.
A. Dricot et al., "Full Parallax Super Multi-Video Coding", 2014 IEEE International Conference on Image Processing (ICIP), Oct. 1, 2014 (Oct. 1, 2014), pp. 135-139, XP055196844.

* cited by examiner

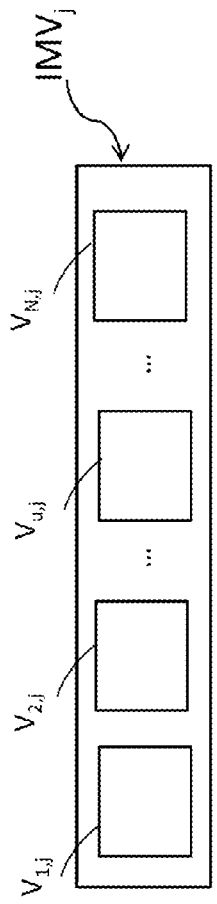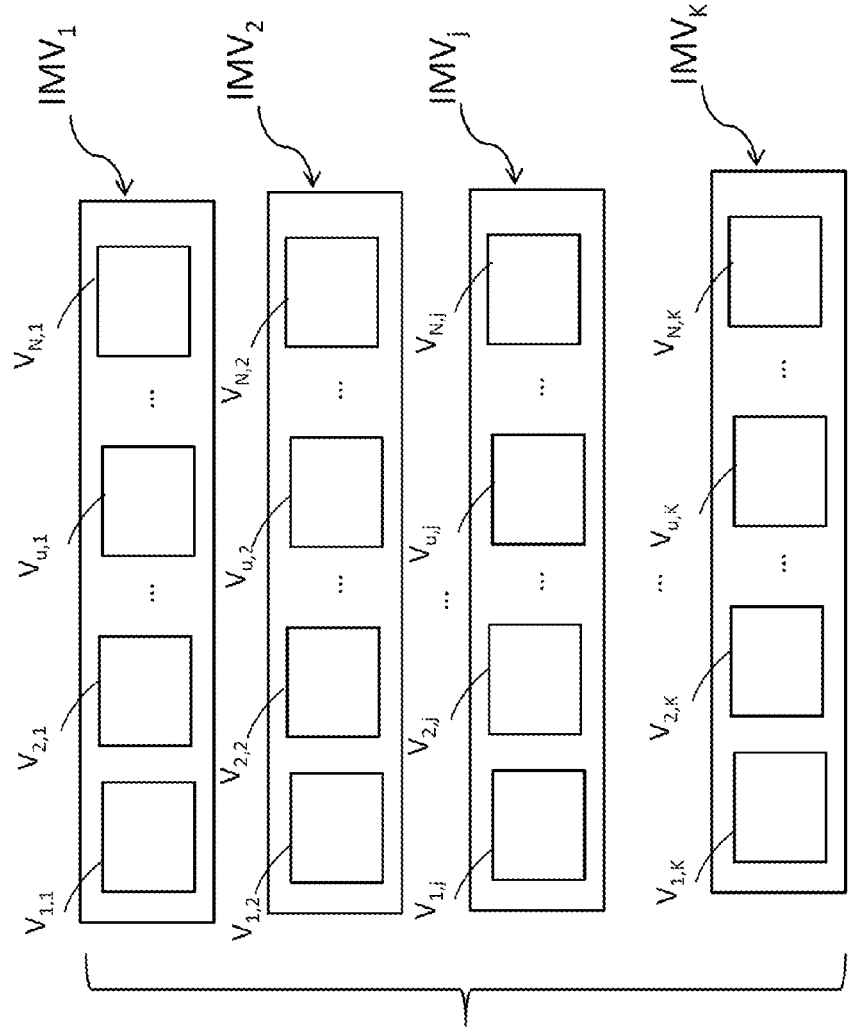
FIG.3A
FIG.3B

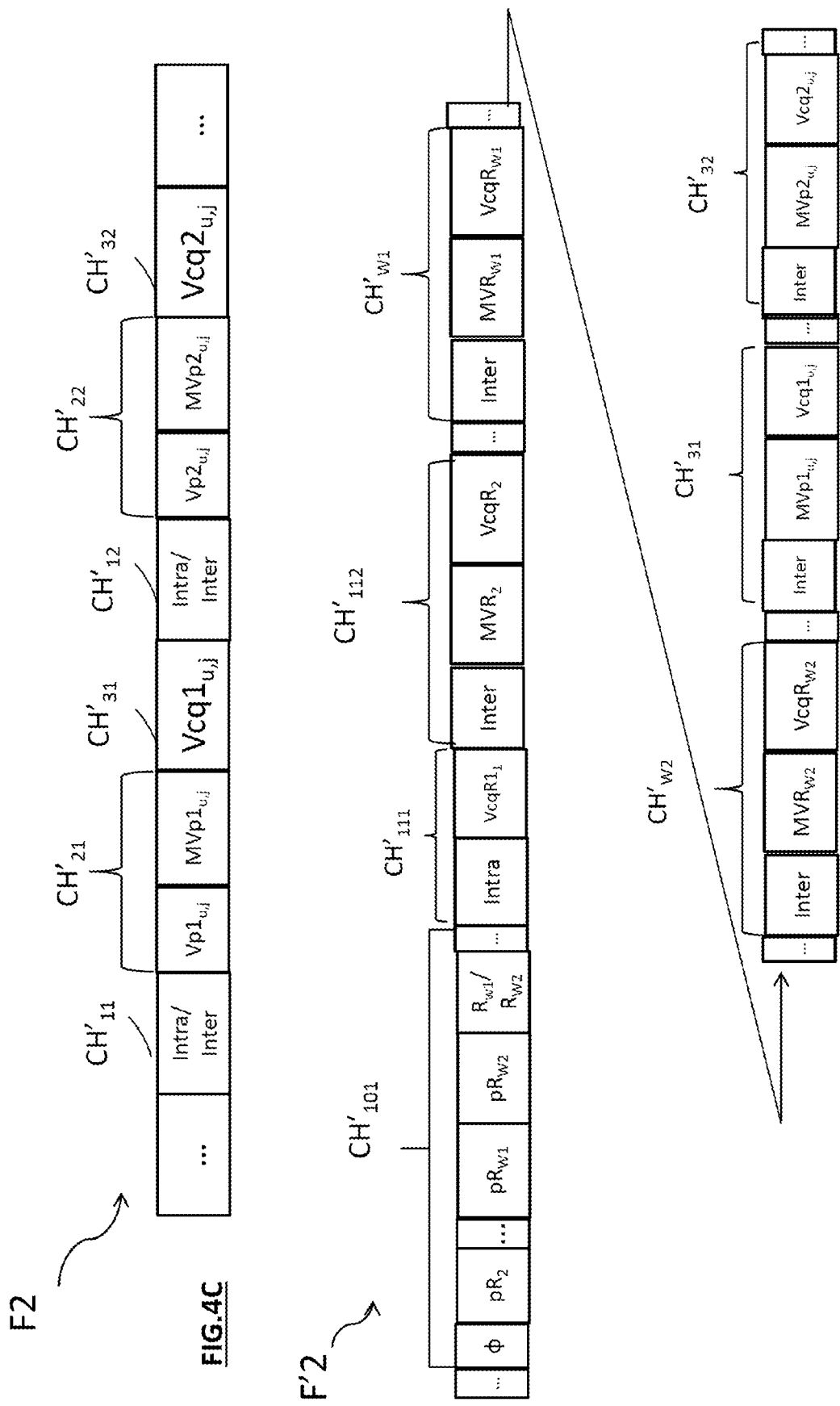

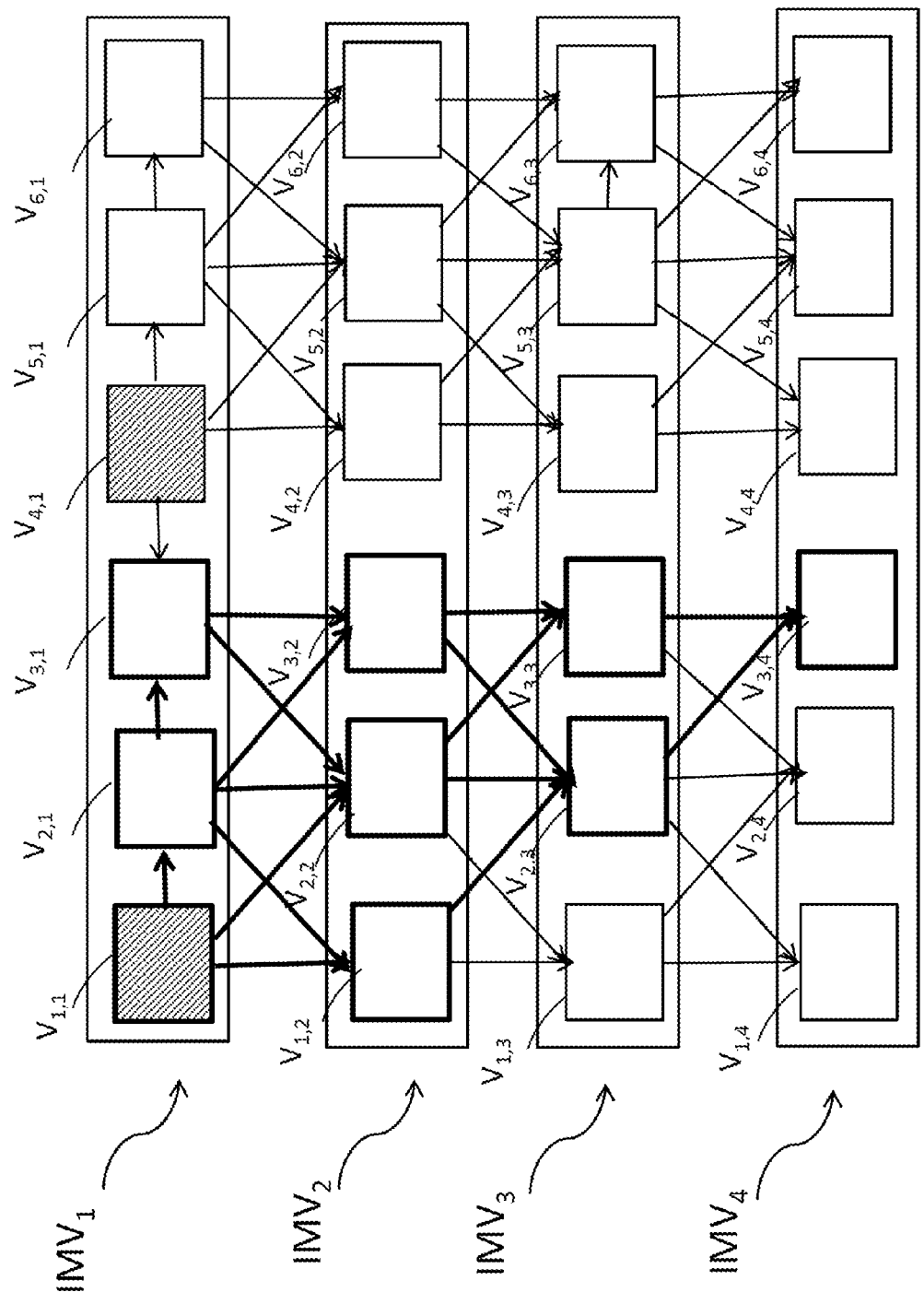

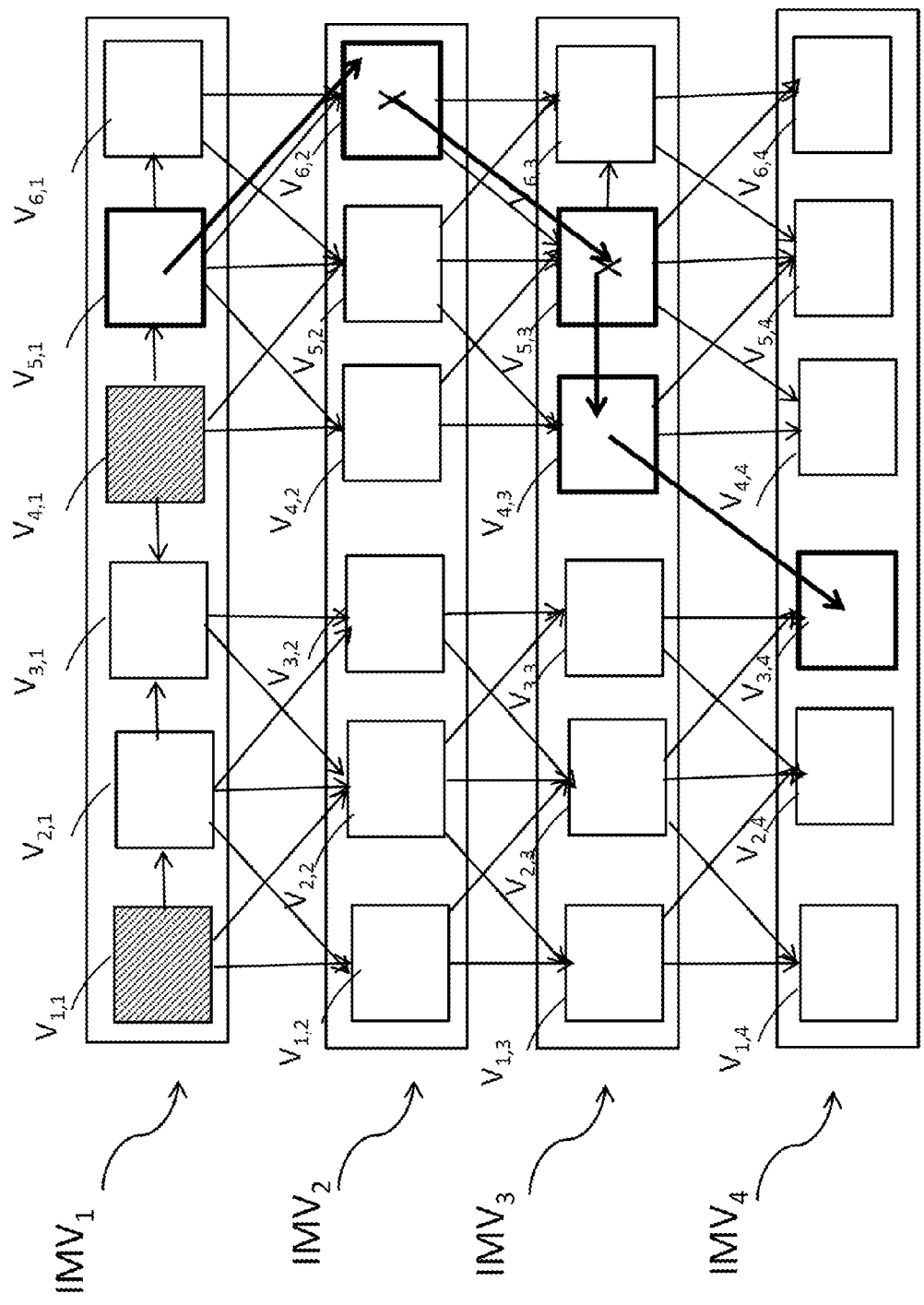

MULTI-VIEW CODING AND DECODING

CROSS-REFERENCE TO RELATED APPLICATIONS

This Application is a Section 371 National Stage Application of International Application No. PCT/FR2016/052475, filed Sep. 29, 2016, which is incorporated by reference in its entirety and published as WO 2017/060587 A1 on Apr. 13, 2017, not in English.

FIELD OF THE INVENTION

The present invention pertains generally to the field of 3D image processing, and more precisely to the coding and to the decoding of multi-view images and of sequences of multi-view images.

The invention can in particular, but not exclusively, be applied to the video coding implemented in the AVC and HEVC current video coders and their extensions (MVC, 3D-AVC, MV-HEVC, 3D-HEVC, etc.), and to the corresponding video decoding.

PRIOR ART

A multi-view image is conventionally obtained by multiplexing, at a current instant t, a set N of views which each represent one and the same 3D scene from a specific angular viewing position. When N is small (typically less than 10), one speaks of a multi-view image. When N is larger, one speaks of a super multi-view image. Generally, for the sake of simplification of the description, a multi-view image will be considered to comprise N views, with N>1.

Several multi-view images each captured at various instants form a sequence of multi-view images.

Such a sequence of multi-view images is coded with the aid of an adapted coding, such as for example an MVC (the abbreviation standing for "Multiview Video Coding") or MV-HEVC (the abbreviation standing for "Multiview High Efficiency Video Coding") coding which utilizes at the same time:
- the spatial redundancies which exist in the very interior of the current view, independently of the other views,
- the inter-view redundancies between the current view to be coded and another view of the current multi-view image,
- the temporal redundancies between the current view to be coded and a view belonging to another multi-view image situated at a different instant from that of said multi-view image and representing the 3D scene from the same angular viewing position as the current view,
- the spatio-temporal redundancies between the current view to be coded and a view belonging to another multi-view image situated at a different instant from that of said multi-view image and representing the 3D scene from a different angular viewing position from that of the current view.

A corresponding decoding of the coded sequence of multi-view images is thereafter implemented so as to be able to play this sequence on the screen of a terminal, such as for example a tablet, a portable telephone, a smartphone, a personal computer, a television receiver, etc. It is thus theoretically possible, for a user, to navigate freely from one view to another in one and the same multi-view image of the sequence or else between a first view belonging to a multi-view image captured at a current instant t and a second view belonging to a multi-view image captured at an instant preceding or following the current instant t. The second view can represent the 3D scene from an angular viewing position which is the same as in the first view or else different.

Although the efficiency of the coding method mentioned hereinabove is proven, the corresponding decoding method is very constraining. Indeed, when the user requests the display of a view of a multi-view image captured at the instant t in the sequence, the decoder is compelled to decode beforehand systematically the set of the views of the multi-view image at the instant t, and also the set of the views of the other multi-view images preceding the instant t in the sequence. The complexity of calculations of the decoder therefore turns out to be very high. The same holds for the latency between the instant at which the user has requested the display of a view and the instant at which the requested view is actually displayed. Having regard to these constraints, such a decoding method is clearly not suited to free navigation between the views of a sequence of multi-view images, in particular in the case where the number N of views is greater than 10.

In order to overcome these drawbacks, it is proposed, in particular in the document "Applying Prediction Techniques to reduce uplink transmission and energy requirements for mobile free viewpoint video applications", De Raffaele, Debono, ICAM 2010, to make the terminal, containing the decoder, dialog with a server. The terminal transmits to the server the views in which the user has navigated inside the sequence at the instants preceding the current instant. Thus, the server undertakes the coding of the view requested at the current instant, by predicting the current view with respect to the views which have been transmitted to it previously. The document "Interactive multiview video system with low decoding complexity", ICIP 2011, Maugey, T., Frossard, P., also utilizes such a dialog between the terminal, containing the decoder, and a server. For this purpose, the terminal transmits to the server, at regular time intervals, the views in which the user has navigated inside the sequence at the instants preceding the current instant. Only the views of the multi-view image which are liable to be selected by the user at the following time interval are encoded.

Such techniques of dialog between the terminal containing the decoder and a server are relatively unwieldy and expensive to implement. Furthermore, they entail non-negligible network bandwidth consumption, thus rendering them hardly realistic, in particular when the user navigates numerous times in the sequence of multi-view images.

SUBJECT AND SUMMARY OF THE INVENTION

One of the aims of the invention is to remedy drawbacks of the aforementioned prior art.

For this purpose, a subject of the present invention relates to a method for decoding at least one current view belonging to a multi-view image which has been previously coded and whose coded data are contained in a data signal, the at least one current view representing a given perspective of a scene, the data signal comprising a set of coded data representative of at least one difference between the at least one current view and at least one other view of the multi-view image or of another multi-view image, the at least one other view having served for the prediction of the at least one current view.

The decoding method according to the invention is noteworthy in that it implements the following:
- determination, in a set of views which belong to the multi-view image or to another multi-view image, of at least one pathway of views that are necessary for the decoding of the at least one current view, the at least one pathway comprising at least one as yet undecoded view, decoding of the at least one view not yet decoded situated on the at least one determined pathway, decoding of the at least one current view on the basis of the set of coded data and of the at least one decoded view situated on the at least one pathway.

Such an arrangement allows the decoder, when decoding a current view, to decode only a restricted set of views of the current multi-view image or of another multi-view image, that is to say one which is situated in a multi-view image sequence, at an instant other than that of the current multi-view image.

Furthermore, the decoding according to the invention makes it possible to use, in this restricted set of views, views which are not necessarily already decoded and available at the instant at which the decoder decodes the current view. Thus, the decoding of a current view can be implemented in a recursive manner, in the sense that if the current view must be decoded with the aid of as yet unreconstructed views, the decoder will firstly have to reconstruct these views, according to a determined pathway order.

Finally, such a decoding is particularly effective with respect to the decodings proposed in the prior art since it allows:

a reduction in the complexity of the calculations, having regard to the restricted number of views to be decoded,
a reduction in the latency between the instant at which a change of view is requested and the instant at which the requested view is decoded and then displayed,
a reduction in the cost of storage, at the decoder, of the decoded views.

The various modes or characteristics of embodiment mentioned hereinafter can be added independently or in combination with one another, to the characteristics of the above-defined decoding method.

According to a particular embodiment, the determination of the at least one pathway is implemented by reading, in the data signal, information representative of the at least one pathway.

Such an arrangement allows the decoder, when decoding a current view, to identify directly from among the information associated with the current view and which is read in the data signal, only the view or else the views which are necessary for the decoding of the current view. This results in a determination of the pathway on decoding which is much simpler and faster than in the prior art where the decoder is constrained to read, in the data signal, the information associated with all the views of the multi-view image, so as to determine the view or the views necessary for decoding the current view. The simplicity and the fast speed of such a decoding makes it possible furthermore to optimize the reduction in the latency between the instant at which a change of view is requested and the instant at which the requested view is decoded and then displayed.

According to another particular embodiment, when the data signal comprises:

first coded data representative of a difference between the at least one current view and a first view of the multi-view image or of another multi-view image,
at least second coded data representative of a difference between the at least one current view and a second view of the multi-view image or of another multi-view image, the decoding method implements a selection either of the first coded data, or of the at least second coded data, the decoding of the at least one current view being implemented on the basis of the at least one decoded view on the at least one pathway and on the basis of the first or of the at least second coded data selected.

For this purpose, the first and the second prediction residual each contain coded data making it possible to obtain a decoded current view which is unique and identical for each of the two residuals. Each residual must comply with the constraint of making it possible to decode one and the same view. This implies that if the current view has been predicted with respect to a first view and to a second view, thus obtaining respectively a first and a second prediction residual, the current view will be able to be reconstructed:

either by adding to the first residual the first view already decoded or not, if it is the first residual which is selected on decoding,
or by adding to the second residual the second view already decoded or not, if it is the second residual which is selected on decoding. The decoder can then advantageously use one of these residuals to decode the current image, such a choice of residual being dependent on the pathway of navigation, by the user, from one view to another.

According to another particular embodiment, the determination of the at least one pathway of views that are necessary for the decoding of the at least one current view is implemented according to a criterion for minimizing the number of views situated on the at least one pathway.

Such an arrangement makes it possible to optimize the reduction in the complexity of the decoder and to increase its decoding speed, during the decoding of the current view. Furthermore, it allows a reduction in the cost of storing the decoded views at the decoder.

According to another particular embodiment, the determination of the at least one pathway of views that are necessary for the decoding of the at least one current view is implemented according to a criterion for minimizing the distance between at least one view which has been decoded without reference to other views and the at least one current view.

Such an arrangement makes it possible, when the current view must be decoded with respect to views situated at different temporal instants, to search for, in order to decode the current view, at least one view which has been decoded independently of other views, doing so in order to maximize the quality of reconstruction of the current view.

According to another particular embodiment, the at least one determined pathway contains a view on which there depends at least one view liable to be decoded at at least one instant which follows or which precedes the current instant.

Such an arrangement allows the decoder to determine a pathway of views that are necessary for the decoding of the current view which are as relevant as possible with respect:

to the geometry of the pathway of navigation performed by the user, from one view to another, up to the current instant,
and to the possible displacement of the user toward this or that next view at at least one instant following or preceding the current instant.

Thus, an optimal pathway is obtained in a definite manner, by taking into account the possible future displacements of the user toward one view or another.

According to another particular embodiment, the determination of the at least one pathway is implemented by estimating, with the aid of a probability calculation, at least one view liable to be decoded at at least one instant which follows or which precedes the current instant.

Such an arrangement allows the decoder to determine a pathway of views that are necessary for the decoding of the current view which are as relevant as possible with respect:
  to the geometry of the pathway of navigation performed by the user, from one view to another, up to the current instant,
  and to the probable displacement of the user toward a next view of a multi-view image situated at at least one instant following or preceding the current instant.

Thus, by taking into account the probable future displacements of the user toward this or that view, the chances of obtaining an optimal pathway are increased.

According to another particular embodiment, if the at least one pathway of views that are necessary for the decoding of the at least one current view does not make it possible to decode the at least one current view because of at least one decoding constraint, the at least one current view is replaced with another view of the multi-view image at the current instant, which is able to be decoded, the other view being the one spatially closest to the at least one current view.

Such an arrangement allows the decoder to select a current view other than that to be decoded, in the case where the determination of the pathway of views that are necessary for the decoding of the current view is not suited to certain decoding constraints. One of these constraints is for example of hardware type. The decoder may in particular be limited in the number of decoded views to be used to decode the current view. Thus, in the case where the pathway determined uses a number of decoded views which is greater than this number, the decoder will not be capable of decoding the current view.

According to another particular embodiment, the decoded and available views being stored in a memory, the memory is updated as a function of the temporal distance which separate them from the at least one current view to be decoded or else when all the views of a multi-view image preceding the multi-view image at the current instant are decoded.

In the field of video coding and decoding applied in particular to multi-view images, at the decoder such a memory is called a "decoded images buffer memory" (or "Decoded Picture Buffer") and necessarily contains a finite number of multi-view images. The present arrangement allows the decoder, by virtue of the determination of the pathway order of the decoded and available views, to delete the decoded views, and if relevant the multi-view images to which they belong, as and when they are used, along the pathway. Consequently, the management of the buffer memory of the decoder is markedly improved thereby.

The invention also relates to a device for decoding at least one current view belonging to a multi-view image which has been previously coded and whose coded data are contained in a data signal, the at least one current view representing a given perspective of a scene, the data signal comprising a set of coded data representative of at least one difference between the at least one current view and at least one other view of the multi-view image or of another multi-view image, the at least one other view having served for the prediction of the at least one current view.

Such a decoding device is noteworthy in that it comprises a processing circuit which is designed to implement the following:
  determination, in a set of views which belong to the multi-view image or to another multi-view image, of at least one pathway of views that are necessary for the decoding of the at least one current view, the at least one pathway comprising at least one as yet undecoded view,
  decoding of the at least one view not yet decoded situated on the at least one determined pathway,
  decoding of the at least one current view on the basis of the set of coded data and of the at least one decoded view situated on the at least one pathway.

Such a decoding device is in particular able to implement the aforementioned decoding method.

The invention also relates to a method for coding at least one multi-view image, in which is implemented the coding of at least one current view of the multi-view image, the at least one current view representing a given perspective of a scene.

Such a coding method is noteworthy in that it implements:
  a first prediction of the at least one current view with respect to a first view of the multi-view image or of another multi-view image, delivering a first set of predicted data,
  at least one second prediction of the at least one current view with respect to a second view of the multi-view image or of another multi-view image, delivering at least one second set of predicted data,
  a coding of the first and of the at least second set of predicted data, the first and at least second sets of coded data being intended to be transmitted separately in a data signal.

Such an arrangement allows the coding to calculate several different prediction residuals for one and the same current view, so as to transmit them to the decoder. The decoder will thus have the possibility of using one of these residuals to decode the current image, such a choice of residual being dependent on the pathway of navigation, by the user, from one view to another.

The invention also relates to a device for coding at least one multi-view image, comprising a processing circuit which is designed to implement the coding of at least one current view of the multi-view image, the at least one current view representing a given perspective of a scene.

Such a coding device is noteworthy in that the processing circuit is furthermore designed to implement:
  a first prediction of the at least one current view with respect to a first view of the multi-view image or of another multi-view image, delivering a first set of predicted data,
  at least one second prediction of the at least one current view with respect to a second view of the multi-view image or of another multi-view image, delivering at least one second set of predicted data,
  a coding of the first and of the at least second set of predicted data, the first and at least second sets of coded data being intended to be transmitted separately in a data signal.

The invention further relates to a computer program comprising instructions for implementing one of the coding and decoding methods according to the invention, when it is executed on a computer.

This program can use any programming language, and be in the form of source code, object code, or of code intermediate between source code and object code, such as in a partially compiled form, or in any other desirable form.

The invention also envisages a recording medium readable by a computer on which is recorded a computer program, this program comprising instructions suitable for the implementation of one of the coding or decoding methods according to the invention, such as are described hereinabove.

The invention also envisages a recording medium readable by a computer on which is recorded a computer program, this program comprising instructions suitable for the implementation of the coding or decoding method according to the invention, such as are described hereinabove.

The recording medium can be any entity or device capable of storing the program. For example, the medium can comprise a storage means, such as a ROM, for example a CD ROM or a microelectronic circuit ROM, or else a magnetic recording means, for example a USB key or a hard disk.

Moreover, the recording medium can be a transmissible medium such as an electrical or optical signal, which can be conveyed via an electrical or optical cable, by radio or by other means. The program according to the invention can be in particular downloaded from a network of Internet type.

Alternatively, the recording medium can be an integrated circuit in which the program is incorporated, the circuit being adapted to execute or to be used in the execution of the aforementioned coding or decoding method.

BRIEF DESCRIPTION OF THE DRAWINGS

Other characteristics and advantages will become apparent on reading several preferred embodiments described with reference to the figures in which:

FIG. 3A represents an exemplary multi-view image, FIG. 3B represents an exemplary sequence of multi-view images, FIG. 4C represents a portion of the data signal obtained on completion of the coding method of FIG. 1B, FIG. 4D represents a variant of the signal portion of FIG. 4C, FIG. 5B represents an exemplary coding tree associated with the at least one current view to be coded in accordance with the coding method of FIG. 1B, FIG. 8B represents an exemplary decoding pathway associated with the at least one current view to be decoded, which has been coded in accordance with one of the alternate coding trees of FIG. 5B.

DESCRIPTION OF THE GENERAL PRINCIPLE OF THE INVENTION

The invention chiefly proposes a technique for decoding at least one current view of a current multi-view image which has been previously coded and whose coded data are contained in a data signal, said decoding technique proposing to decode only the view or views actually necessary for the decoding of the at least one current view.

According to the invention, from among the views necessary for the decoding of the at least one current view, at least one of them is a view which has not yet been decoded and which is therefore not available at the instant at which the decoding of the at least one current view is undertaken. Such an as yet undecoded view can belong to the current multi-view image and therefore represent a scene from a different angular viewing position from that of the at least one current view. Such an as yet undecoded view can also belong to a multi-view image which is different from the current multi-view image, that is to say one which is situated, in a sequence of multi-view images, at an instant other than that of the current multi-view image. In this case, the view necessary for the decoding of the current image can be a view representing the scene from the same angular viewing position as the at least one current view or else from a different angular viewing position from that of the at least one current view.

DETAILED DESCRIPTION OF A FIRST EMBODIMENT

According to a first embodiment, the decoding technique according to the invention relies on a conventional method for coding multi-view images, such as implemented in a coder in accordance with any one of the current or forthcoming video coding standards.

Coding

Figure 1A:
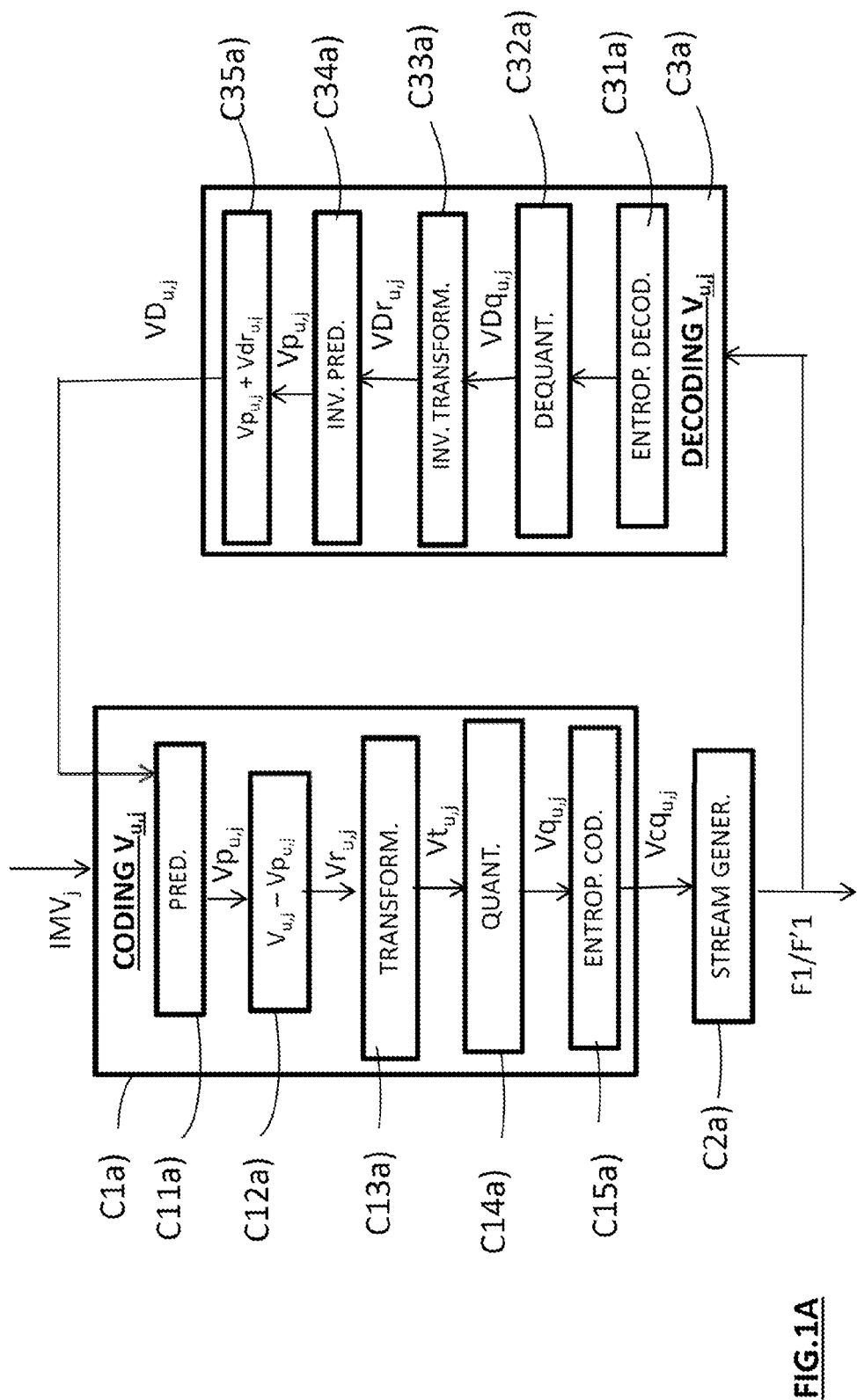
FIG. 1A represents the steps of the coding method according to a first embodiment of the invention.

The coding method in accordance with the first embodiment is represented in the form of an algorithm comprising steps C1a) to C3a) such as represented in FIG. 1A.

Figure 2A:
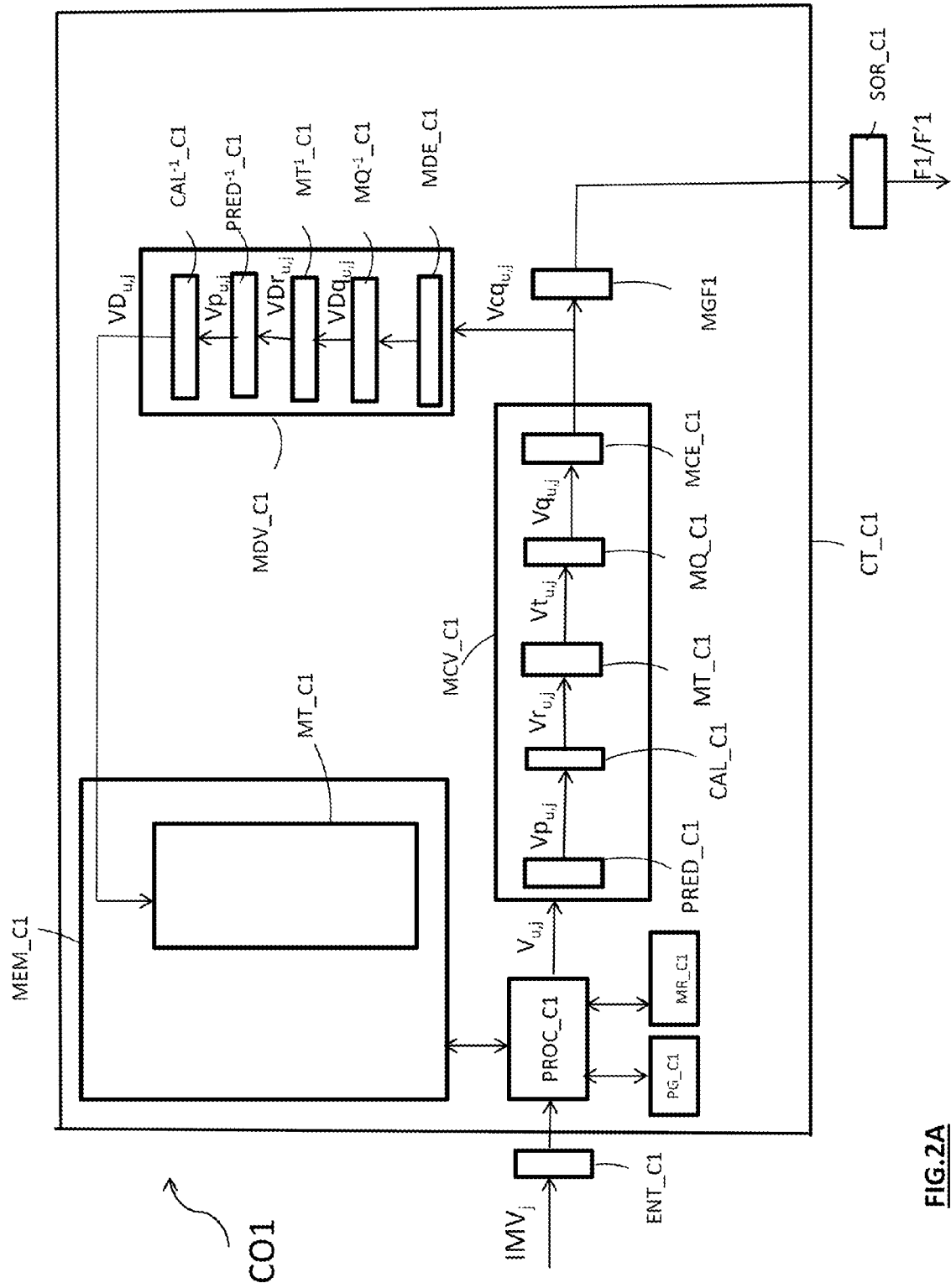
FIG. 2A represents a coding device implementing the coding method of FIG. 1A.

According to the first embodiment of the invention, the coding method is implemented in a coding device or coder CO1 represented in FIG. 2A.

As illustrated in FIG. 2A, such a coder device comprises:
an input ENT_C1 for receiving a current multi-view image to be coded,
a processing circuit CT_C1 for implementing the coding method according to the first embodiment, the processing circuit CT_C1 containing:

a memory MEM_C1 comprising a buffer memory MT_C1, a processor PROC_C1 driven by a computer program PG_C1, an output SOR_C1 for delivering a coded stream containing the data obtained on completion of the coding of the current multi-view image.

On initialization, the code instructions of the computer program PG_C1 are for example loaded into a RAM memory, MR_C1, before being executed by the processing circuit CT_C1.

The coding method represented in FIG. 1A applies to any current multi-view image $IMV_j$ which is a still image or else forms part of a sequence of multi-view images $IMV_1, \ldots, IMV_j, \ldots, IMV_K$ ($1 \leq j \leq K$) to be coded.

As represented in FIG. 3A, a current multi-view image $IMV_j$ at a current instant $t_j$ is composed of N various views $V_{1,j}, V_{2,j}, \ldots, V_{u,j}, \ldots, V_{N,j}$ which each represent one and the same scene according to a corresponding angular viewing position, such that N>1 and $1 \leq u \leq N$.

As represented in FIG. 3B, a sequence of multi-view images comprises a plurality K of multi-view images $IMV_1, IMV_2, \ldots, IMV_j, \ldots, IMV_K$, such that $1 \leq j \leq K$, which follow one another respectively at the instants t1, t2, ..., tj, ..., tK.

At the instant t1, the multi-view image $IMV_1$ is composed of N various views $V_{1,1}, V_{2,1}, \ldots, V_{u,1}, \ldots, V_{N,1}$ which each represent one and the same scene according to a corresponding angular viewing position.

At the instant t2, the multi-view image $IMV_2$ is composed of N various views $V_{1,2}, V_{2,2}, \ldots, V_{u,2}, \ldots, V_{N,2}$ which each represent one and the same scene according to a corresponding angular viewing position.

. . .

At the instant tj, the multi-view image $IMV_j$ is composed of N various views $V_{1,j}, V_{2,j}, \ldots, V_{u,j}, \ldots, V_{N,j}$ which each represent one and the same scene according to a corresponding angular viewing position.

. . .

At the instant tK, the multi-view image $IMV_K$ is composed of N various views $V_{1,K}, V_{2,K}, \ldots, V_{u,K}, \ldots, V_{N,K}$ which each represent one and the same scene according to a corresponding angular viewing position.

In the course of a step C1a) represented in FIG. 1A, for a current multi-view image $IMV_j$, there is undertaken the coding of said at least one view $V_{u,j}$.

Such a step C1a) is implemented by a view coding device MCV_C1 such as represented in FIG. 2A, which device is driven by the processor PROC_C1.

Such a device MCV_C1 for coding views conventionally comprises:

a prediction device PRED_C1, a device CAL_C1 for calculating residual data, a device MT_C1 for a transformation of DCT (the abbreviation standing for "Discrete Cosine Transform"), DST (the abbreviation standing for "Discrete Sine Transform"), DWT (the abbreviation standing for "Discrete Wavelet Transform") type, a quantization device MQ_C1, an entropy coding device MCE_C1 for example of CABAC ("Context Adaptive Binary Arithmetic Coder") type or else a Huffman coder known as such.

In a manner known per se, in the course of step C1a), there is undertaken a sub-step C11a) of predicting said at least one view $V_{u,j}$ by known techniques of intra and/or inter prediction. For this purpose, said at least one view $V_{u,j}$ is predicted in accordance with a mode of prediction selected from among a plurality of predetermined modes of prediction. For example, in the case of a coding of MVC type, and as already explained previously, said at least one view $V_{u,j}$ can be predicted:

independently of the other views of the multi-view image $IMV_j$ or of the sequence of K multi-view images $IMV_1, IMV_2, \ldots, IMV_j, \ldots IMV_K$, with respect to another view of the current multi-view image $IMV_j$, with respect to a view belonging to a multi-view image other than said current multi-view image and representing the scene from the same angular viewing position as said at least one current view, with respect to a multi-view image other than said current multi-view image $IMV_j$ and representing the scene from a different angular viewing position from that of the at least one current view.

The predictor view used to predict the at least one current view $V_{u,j}$ is a view which has already been coded and then decoded. A predictor view such as this is stored beforehand in the buffer memory MT_C1 of the coder CO1, such as represented in FIG. 2A.

For the at least one current view $V_{u,j}$ to be coded, an optimal predictor view $Vp_{u,j}$ is obtained subsequent to said predetermined modes of prediction being set into competition, for example by minimizing a distortion bitrate criterion well known to the person skilled in the art. The optimal predictor view is considered to be an approximation of the at least one current view $V_{u,j}$ considered.

Such a sub-step C11a) is implemented by the prediction device PRED_C1 represented in FIG. 2A.

The coding step C1a) also comprises a sub-step C12a) in the course of which there is undertaken conventionally the calculation of the difference between the at least one current view $V_{u,j}$ and the optimal predictor view $Vp_{u,j}$ which was selected on completion of sub-step C11a).

A residual view $Vr_{u,j}$ is then obtained on completion of sub-step C12a).

Such a sub-step C12a) is implemented by the calculation module CAL_C1 represented in FIG. 2A.

The coding step C1a) also comprises a sub-step C13a) in the course of which there is undertaken conventionally the transformation of the residual view $Vr_{u,j}$ according to a conventional direct transformation operation such as for example a transformation of DCT, DST or DWT type, to produce a transformed view, designated by the reference $Vt_{u,j}$. Such an operation is performed by the device MT_C1 represented in FIG. 2A.

The coding step C1a) also comprises a sub-step C14a) in the course of which there is undertaken conventionally the quantization of the transformed view $Vt_{u,j}$ according to a conventional quantization operation, such as for example a scalar or vector quantization. A set $Vq_{u,j}$ of quantized coefficients is then obtained on completion of this sub-step. Such a sub-step C14a) is performed by means of the quantization device MQ_C1 such as represented in FIG. 2A.

The coding step C1a) also comprises a sub-step C15a) in the course of which there is undertaken conventionally the coding of the set $Vq_{u,j}$ of coefficients according to a predetermined order, such as "scan raster" order in particular. A set $Vcq_{u,j}$ of coded data is then obtained on completion of sub-step C15a).

In the preferred embodiment, the coding performed is an entropy coding of arithmetical or Huffman type. Sub-step C15a) then consists in:

reading the symbol or symbols of a predetermined set of symbols which are associated with the quantized data of the view $V_{u,j}$, associating digital information, such as bits, with the symbol(s) read.

Such a sub-step C15a) of entropy coding is implemented by the entropy coding module MCE_C1 represented in FIG. 2A.

Figure 4A:
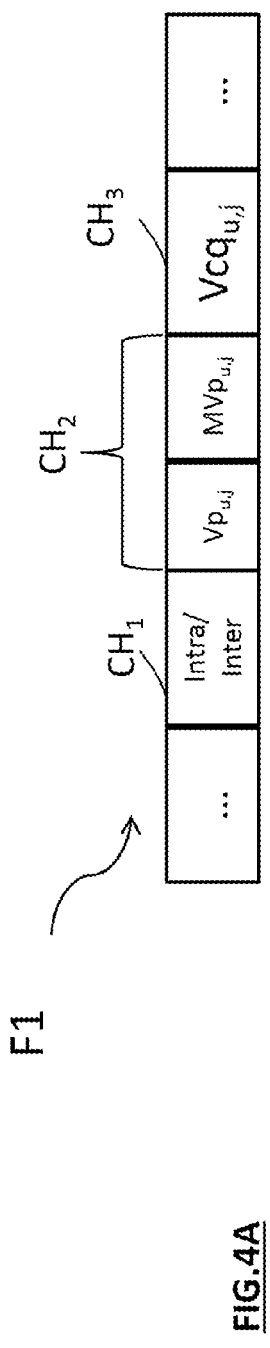
FIG. 4A represents a portion of the data signal obtained on completion of the coding method of FIG. 1A.

On completion of the step C1a) of coding the view $V_{u,j}$, there is undertaken, in the course of a step C2a) represented in FIG. 1A, the formulation of a data signal F1 which, in a manner known per se, as represented in FIG. 4A, comprises:

a field $CH_1$ containing the type of prediction (inter or intra) applied in sub-step C11a) of FIG. 1A, and if relevant, the prediction mode selected, if the Inter prediction mode has been applied, a field $CH_2$ containing the index of at least the predictor view $Vp_{u,j}$ selected on completion of sub-step C11a) and the at least one motion vector used $MVp_{u,j}$, a field $CH_3$ containing the set of the entropically coded data $Vcq_{u,j}$ associated with the view $V_{u,j}$.

Such a signal is thereafter delivered via the output SOR_C1 of the coder CO1 of FIG. 2A, and then transmitted by a communication network (not represented), to a remote terminal. The latter comprises a decoder which will be described in greater detail subsequently in the description.

Step C2a) of producing such a signal is implemented by the data signal generation module MGF1, such as represented in FIG. 2A.

According to an innovative variant embodiment specific to the invention, for each of the views of the sequence of images considered, or for each of the views of a subset of views of the sequence of images considered, said views having themselves been coded according to an intra or inter prediction mode, it is proposed to signal in a particular field of the signal F'1:

either an item of information representative of the fact that the view considered in the sequence of images has been Intra coded, or an item of information representative of the index of the at least one predictor view which has been used to predict the view considered in the sequence of images.

Figure 4B:
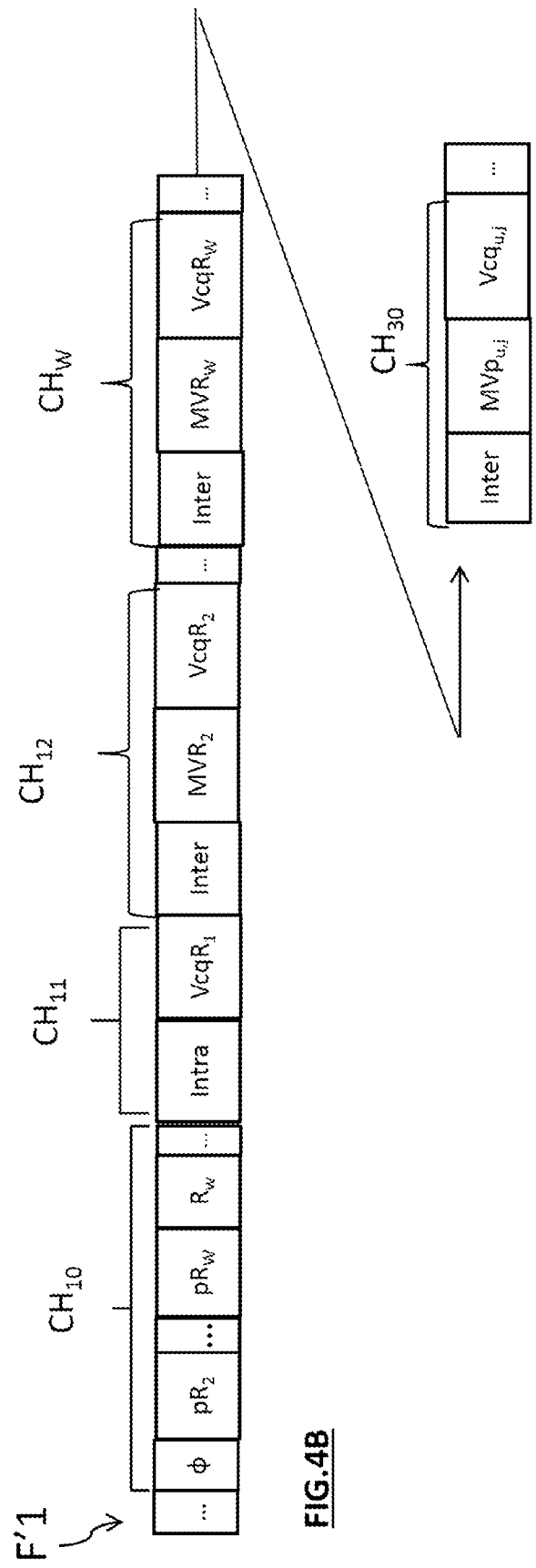
FIG. 4B represents a variant of the signal portion of FIG. 4A.

In the example represented in FIG. 4B, where, for simplification reasons, only a portion of the signal F'1 is represented, in which portion is signaled only a subset of views of the sequence of images considered, which subset contains said at least one current view $V_{u,j}$ which has been coded, as well as a number W of views $VR_1, \ldots, VR_W$ which have been coded before said at least one current view $V_{u,j}$, said first view $VR_1$ having been coded in intra mode and the other views $VR_2$ to $VR_W$ having each been coded for example in inter mode with respect to the at least one corresponding predictor view $VpR_2$ to $VpR_W$. It is also assumed that said at least one current view $V_{u,j}$ has been inter coded with respect to at least the view $VR_W$.

According to the variant embodiment represented, the portion of the signal F'1 advantageously comprises a field $CH_{10}$ containing a first item of information, designated for example by the symbol $\phi$, and representative of the fact that the first view $VR_1$ of the subset of views of the sequence of images considered has been intra coded, the index $pR_2$ of at least the view $VpR_2$ which has served for the prediction of the view $VR_2$, the index $pR_W$ of at least the view $VpR_W$ which has served for the prediction of the view $VR_W$, the index $R_W$ of at least the predictor view $VR_W$ which has served for the prediction of said at least one current view $V_{u,j}$.

In accordance with this variant, there is then undertaken, in the course of step C2a) represented in FIG. 1A, the formulation of a portion of the data signal F'1, which portion is specifically associated with the coding of said at least one current view $V_{u,j}$.

Such a formulation consists in adding to the signal F'1, in a similar manner to FIG. 4A, a field $CH_{30}$ containing the type of prediction, here inter, associated with said at least one current view $V_{u,j}$, the at least one motion vector $MVp_{u,j}$ describing the motion between said at least one predictor view $VR_W$ and said at least one current view $V_{u,j}$, the set of the entropically coded data $Vcq_{u,j}$ associated with said at least one current view $V_{u,j}$. The field $CH_{30}$ gets added to the following fields already present in the signal F'1:

the field $CH_{11}$ added previously during the coding of the first view $VR_1$ of the subset of views of the sequence of images considered and containing the type of prediction (intra) associated with this view, as well as the set of the entropically coded data $VcqR_1$ associated with this view, the field $CH_{12}$ added previously during the coding of the second view $VR_2$ of the subset of views of the sequence of images considered and containing the type of prediction (inter) associated with this view, the at least one motion vector $MVR_2$ describing the motion between the at least one predictor view $VpR_2$ and the view $VR_2$, the set of the entropically coded data $VcqR_2$ associated with the view $VR_2$,

..., the field $CH_W$ added previously during the coding of the view $VR_W$ of the subset of views of the sequence of images considered and containing the type of prediction (inter) associated with the view $VR_W$ of the sequence of images considered, the at least one motion vector $MVR_W$ describing the motion between the at least one predictor view $VpR_W$ and the view $VR_W$, the set of the entropically coded data $VcqR_W$ associated with the view $VR_W$.

According to one embodiment, such a formulation consists furthermore in adding to the signal F'1, in the field $CH_{10}$, the index $R_W$ of at least the predictor view $VR_W$ which has served for the prediction of said at least one current view $V_{u,j}$, as a supplement to the predictor view indices $pR_2, \ldots, pR_W$ already present in the field $CH_{10}$.

According to another embodiment, the addition of the index $R_W$ is not necessary in the case where it is already present in the field $CH_{10}$. According to this other embodiment, the field $CH_{10}$ has been supplemented with all the indices of the predictor views of the views of the subset of views considered, prior to the coding of these views.

By virtue of the presence of the field $CH_{10}$, the coding dependencies associated with said at least one current view $V_{u,j}$ are indicated in a grouped-together manner in the signal F'1 and will thus be rendered accessible rapidly and directly during the decoding of said at least one current view $V_{u,j}$.

In a manner known per se, in the course of a step C3a) represented in FIG. 1A, the decoding of the at least one current view $V_{u,j}$ is undertaken.

Such a step C3a) is implemented by a view decoding device MDV_C1 such as represented in FIG. 2A.

Such a device MDV_C1 for decoding views conventionally comprises:

an entropy decoding device MDE_C1, for example of CABAC ("Context Adaptive Binary Arithmetic Coder") type or else a Huffman decoder known as such, a dequantization module $MQ^{-1}\_C1$, a module $MT^{-1}\_C1$ for an inverse transformation of $DCT^{-1}$ (the abbreviation standing for "Discrete Cosine Transform"), $DST^{-1}$ (the abbreviation standing for "Discrete Sine Transform"), $DWT^{-1}$ (the abbreviation standing for "Discrete Wavelet Transform") type, an inverse prediction module $PRED^{-1}\_C1$, a view reconstruction calculation module $CAL^{-1}\_C1$.

In the course of step C3a), there is undertaken a sub-step C31a) of entropy decoding of the entropically coded data $Vcq_{u,j}$ associated with the at least one current view $V_{u,j}$, according to a predetermined order. In the preferred embodiment, the decoding performed is an entropy decoding of arithmetical or Huffman type. Sub-step C31a) then consists in:

reading the symbol or symbols of a predetermined set of symbols which are associated with the entropically coded data $Vcq_{u,j}$ of the view $V_{u,j}$, associating digital information, such as bits, with the symbol(s) read.

On completion of the aforementioned sub-step C31a), a plurality of digital information items is obtained, which items are associated with the quantized data which have been coded in the course of the aforementioned step C15a).

Such an entropy decoding sub-step C31a) is implemented by the entropy decoding device MDE_C1 represented in FIG. 2A.

In the course of the aforementioned sub-step C31a), the index of the predictor view $Vp_{u,j}$ which has been used to predict the at least one current view $V_{u,j}$ in sub-step C11a) of FIG. 1A is also decoded.

The coding step C3a) also comprises a sub-step C32a) in the course of which there is undertaken the dequantization of the digital information obtained subsequent to sub-step C31a), according to a conventional dequantization operation which is the operation inverse to the quantization implemented in sub-step C14a). A set $VDq_{u,j}$ of dequantized coefficients is then obtained on completion of this sub-step. Such a sub-step C32a) is implemented by the dequantization device $MQ^{-1}\_C1$ such as represented in FIG. 2A.

The coding step C3a) also comprises a sub-step C33a) in the course of which there is undertaken a transformation of the set $VDq_{u,j}$ of quantized coefficients which is of $DCT^{-1}$, $DST^{-1}$ or $DWT^{-1}$ type. This transformation is the operation inverse to the transformation performed in sub-step C13a). On completion of this sub-step, a decoded residual view is obtained, such as is designated by the reference $VDr_{u,j}$. Such an operation is performed by the device $MT^{-1}\_C1$ represented in FIG. 2A.

The coding step C3a) also comprises a sub-step C34a) of predicting said at least one current view $V_{u,j}$ to be decoded, by selecting, in the buffer memory MT_C1 of FIG. 2A, the at least one optimal predictor view $Vp_{u,j}$ obtained subsequent to the aforementioned sub-step C11a), which is associated with the index decoded on completion of sub-step C31a).

Such a sub-step C34a) is implemented by the prediction device $PRED^{-1}\_C1$ represented in FIG. 2A.

The coding step C3a) also comprises a calculation sub-step C35a), in the course of which there is undertaken the construction (otherwise called inverse prediction) of the at least one decoded view $VD_{u,j}$ by adding to the at least one decoded residual view $VDr_{u,j}$ obtained on completion of sub-step C33a), at least the predictor view $Vp_{u,j}$ which has been identified in the aforementioned sub-step C31a).

Such a sub-step C35a) is implemented by the calculation device $CAL^{-1}\_C1$ represented in FIG. 2A.

The coding steps C1a) to C3a) which have just been described hereinabove are thereafter implemented for each of the views $V_{u,1}, V_{u,2}, \ldots, V_{u,N}$ to be coded of the current multi-view image $IMV_j$ considered.

Figure 5A:
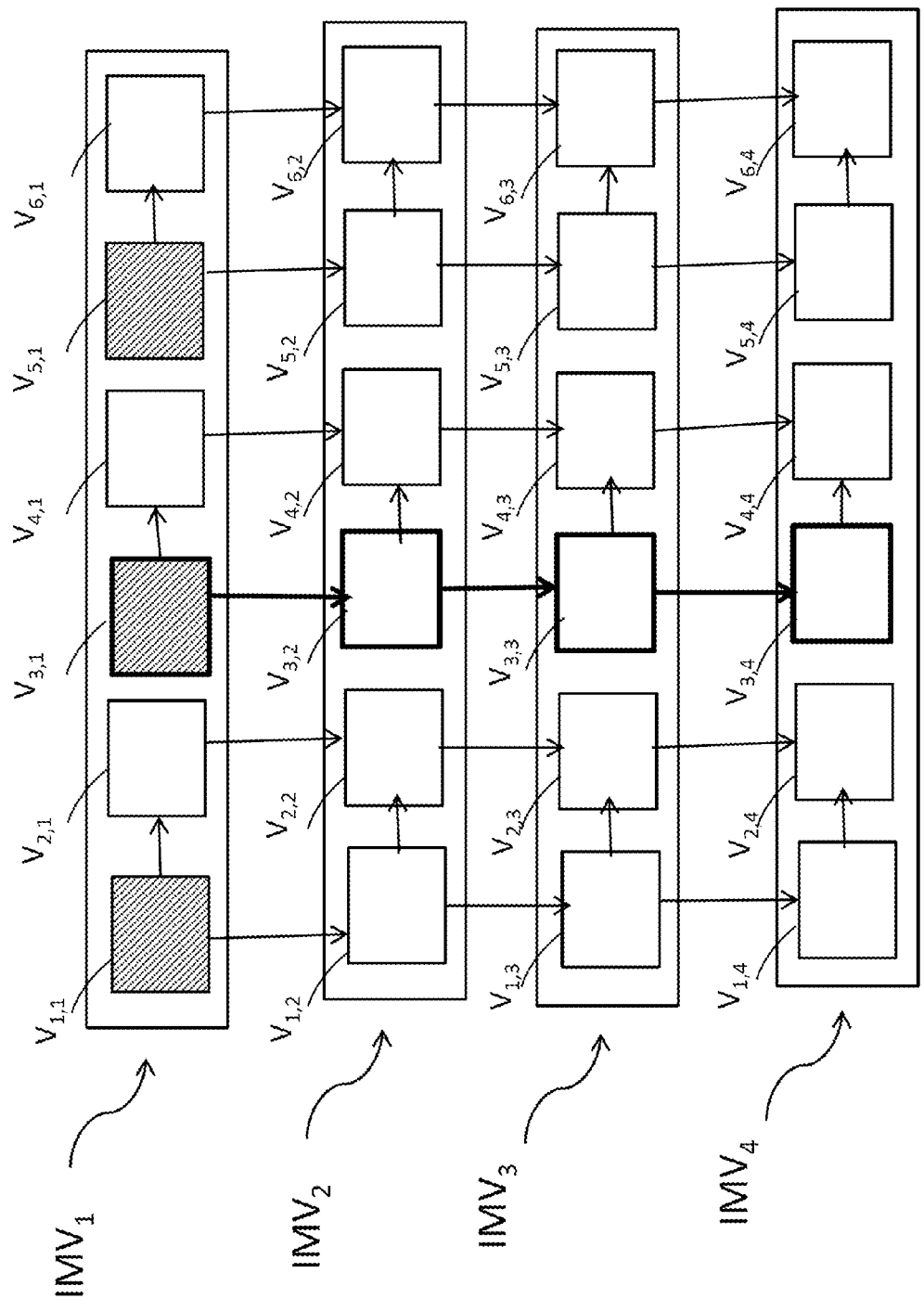
FIG. 5A represents an exemplary coding tree associated with the at least one current view to be coded in accordance with the coding method of FIG. 1A.

With reference now to FIG. 5A, there is represented an exemplary coding of at least one current view $V_{u,j}$ according to the coding method of FIG. 1A. In the example represented, the current multi-view image $IMV_j$ is the fourth image $IMV_4$ of a sequence of multi-view images, each multi-view image comprising for example six views. The at least one coded current view which is considered in this example is for example the third view $V_{3,4}$, starting from the left, of the current multi-view image $IMV_4$. The view $V_{3,4}$ is represented in bold in FIG. 5A.

In the example represented, the current view $V_{3,4}$ is coded in Inter mode on the basis of the view $V_{3,3}$ of the multi-view image IMV3. The view $V_{3,3}$ has itself been Inter coded with respect to the view $V_{3,2}$ of the multi-view image IMV2. The view $V_{3,2}$ has itself been Inter coded with respect to the view $V_{3,1}$ of the multi-view image IMV1. The view $V_{3,1}$ has itself been Intra coded, this mode being represented by hatching in FIG. 5A. The view to view coding dependencies are for their part represented by arrows in FIG. 5A. Stated otherwise, the current view $V_{3,4}$ is coded according to a coding tree comprising the view $V_{3,1}$, the view $V_{3,2}$ and the view $V_{3,3}$. Such a tree is represented in bold in FIG. 5A.

Decoding

A first embodiment of the invention will now be described, in which the decoding method is used to decode at least one current view belonging to a multi-view image which has been previously coded in accordance with the coding method of FIG. 1A and whose coded data are contained in the data signal F1 or F'1. The at least one current view is able to be decoded by a decoder in accordance with any one of the current or forthcoming video decoding standards.

The decoding method according to the first embodiment of the invention is for example implemented in a software or hardware manner by modifications of such a decoder.

Figure 6A:
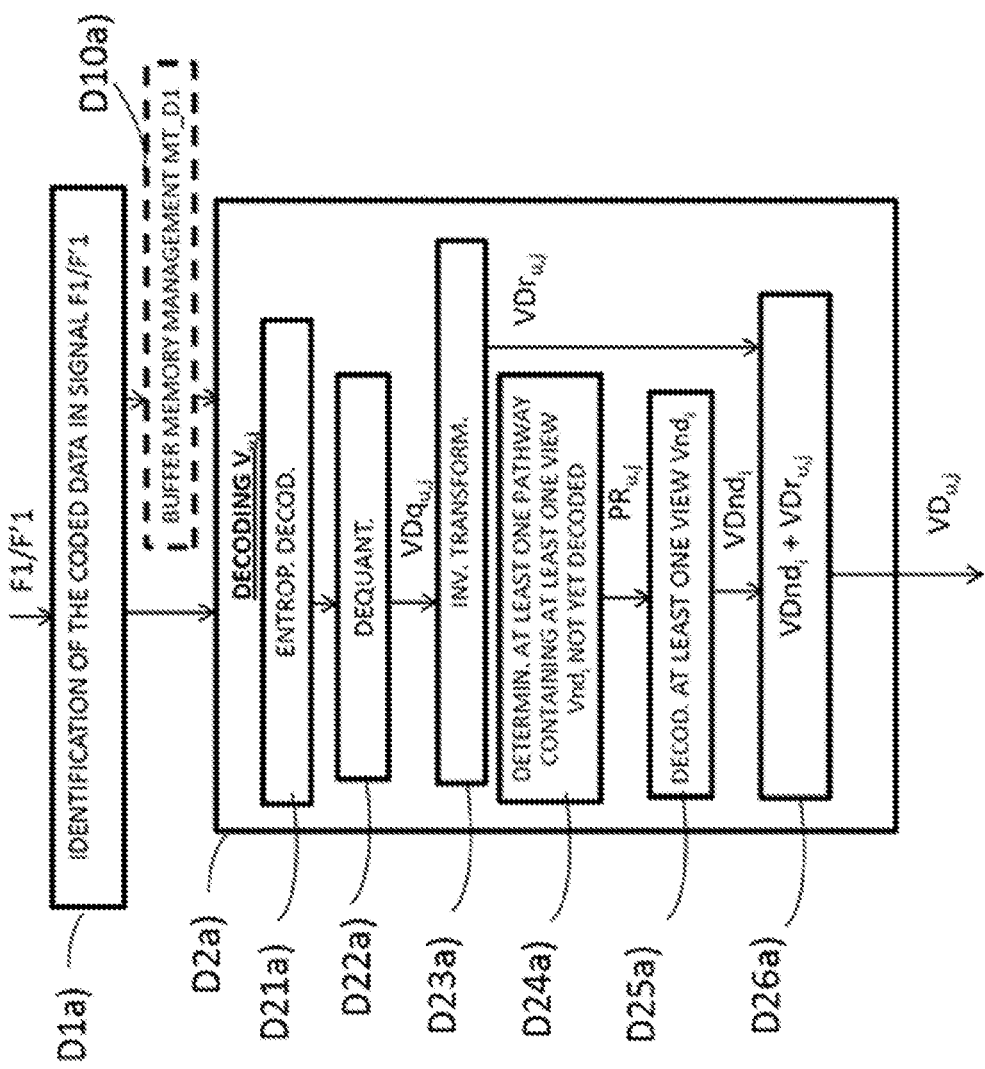
FIG. 6A represents the steps of the decoding method according to a first embodiment of the invention.

The decoding method according to the invention is represented in the form of an algorithm comprising steps D1a) to D2a) such as represented in FIG. 6A.

Figure 7A:
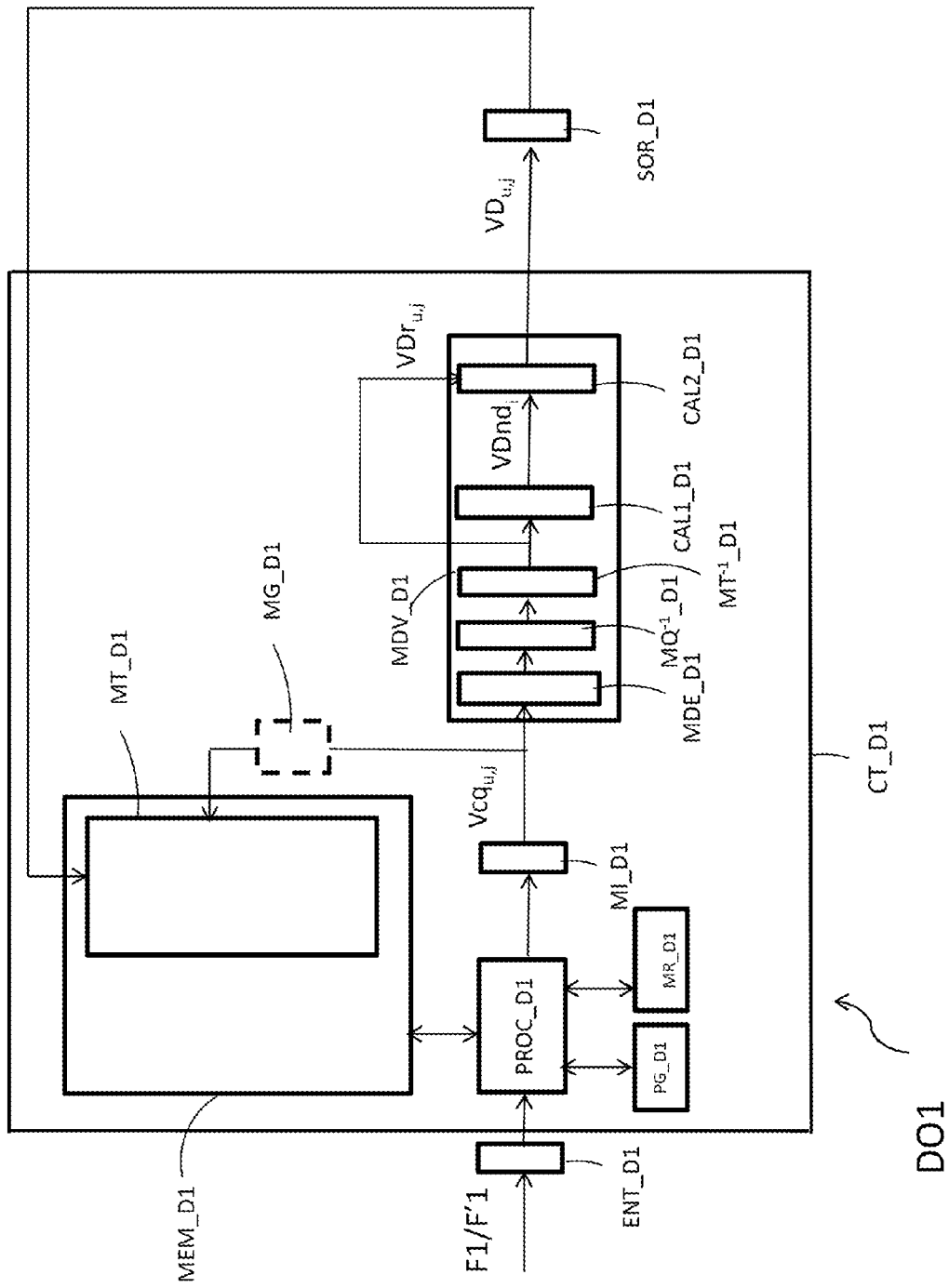
FIG. 7A represents a decoding device implementing the decoding method of FIG. 6A.

According to this first embodiment, the decoding method according to the invention is implemented in a decoding device or decoder DO1 represented in FIG. 7A.

As illustrated in FIG. 7A, such a decoder device comprises:

an input ENT_D1 for receiving the data signal F1 or F'1 representative of the current multi-view image which has been previously coded, a processing circuit CT_D1 for implementing the decoding method according to the invention, the processing circuit CT_D1 containing:

a memory MEM_D1 comprising a buffer memory MT_D1, a processor PROC_D1 driven by a computer program PG_D1, an output SOR_D1 for delivering at least one reconstructed current view containing the data obtained on completion of the decoding according to the first embodiment.

On initialization, the code instructions of the computer program PG_D1 are for example loaded into a RAM memory, MR_D1, before being executed by the processing circuit CT_D1.

The decoding method represented in FIG. 6A applies to any current view $V_{u,j}$ of a current multi-view image $IMV_j$ which is a still image or else forms part of a sequence of multi-view images $IMV_1, \ldots, IMV_j, \ldots, IMV_K$ ($1 \leq j \leq K$).

For this purpose, information representative of the at least one current view $V_{u,j}$ to be decoded are identified:

either in the corresponding portion, represented in FIG. 4A, of the data signal F1 received at the decoder and such as delivered subsequent to the coding method of FIG. 1A, or in the corresponding portion, represented in FIG. 4B, of the data signal F'1 received at the decoder and such as delivered subsequent to the coding method of FIG. 1A.

In the course of a step D1a) represented in FIG. 6A, there is undertaken, in a manner known per se, the identification, in the corresponding portion of the data signal F1:

of the set of the data $Vcq_{u,j}$ associated with the at least one current view $V_{u,j}$, such as coded entropically subsequent to the coding sub-step C15a) of FIG. 1A and contained in the field $CH_3$ of the data signal F1 represented in FIG. 4A, of the item of information for identifying the at least one predictor view $Vp_{u,j}$ obtained subsequent to the prediction sub-step C11a) of the coding method represented in FIG. 1A and contained in the field $CH_2$ of the data signal F1 represented in FIG. 4A, such an item of information consisting for example in the index of the at least one predictor view $Vp_{u,j}$, of the at least one motion vector used $MVp_{u,j}$ in association with the at least one predictor view $Vp_{u,j}$, such as also contained in the field $CH_2$, of the inter or intra prediction type.

According to an innovative variant of step D1a) represented in FIG. 6A, there is undertaken the identification, in the corresponding portion of the data signal F'1 of FIG. 4B:

on the basis of the field $CH_{30}$, of the set of the data $Vcq_{u,j}$ associated with the at least one current view $V_{u,j}$, such as coded entropically subsequent to the coding sub-step C15a) of FIG. 1A, of the inter prediction type associated with said at least one current view $V_{u,j}$, of the at least one motion vector $MVp_{u,j}$ describing the motion between the at least one view $VR_W$ and said at least one current view $V_{u,j}$, on the basis of the field $CH_{10}$, of the index $R_W$ of at least the view $VR_W$ which has served for the prediction of said at least one current view $V_{u,j}$, and optionally, if such information is not yet known at the time of the decoding of said at least one current view $V_{u,j}$, of the item of information according to which the first view $VR_1$ has been Intra predicted, of the index $pR_2$ of at least the view $VpR_2$ which has served for the prediction of the view $VR_2, \ldots$, of the index $pR_W$ of at least the view $VpR_W$ which has served for the prediction of the view $VR_W$.

The identification step D1a) is implemented by a signal analysis device MI_D1, such as represented in FIG. 7A.

According to the invention, subsequent to step D1a), there is undertaken, in the course of a step D2a) represented in FIG. 6A, the decoding of the at least one entropically coded current view $V_{u,j}$.

Such a step D2a) is implemented by a view decoding device MDV_D1 such as represented in FIG. 7A.

In the course of the decoding step D2a), there is undertaken conventionally a sub-step D21a) of entropy decoding of the entropically coded data $Vcq_{u,j}$ associated with said at least one current view $V_{u,j}$ to be decoded, according to a predetermined order. In the preferred embodiment, the decoding performed is an entropy decoding of arithmetical or Huffman type. Sub-step D21a) then consists in:

reading the symbol or symbols of a predetermined set of symbols which are associated with the quantized data set $Vcq_{u,j}$ relating to said at least one current view $V_{u,j}$, associating digital information, such as bits, with the symbol(s) read.

On completion of the aforementioned sub-step D21a), a plurality of digital information items is obtained, which items are associated with the quantized data which have been coded in the course of the entropy coding step C15a) of FIG. 1A.

Such an entropy decoding sub-step D21a) is implemented by an entropy decoding device MDE_D1 of the view decoding device MDV_D1 of FIG. 7A.

In the course of the aforementioned sub-step D21a), the index of the at least one predictor view $Vp_{u,j}$ which has been used to predict the at least one current view $V_{u,j}$ during sub-step C11a) of FIG. 1A is also decoded. The at least one predictor view $Vp_{u,j}$ is a view which has or has not already been decoded. In the case where the at least one predictor view $Vp_{u,j}$ has been decoded, it is stored beforehand in the buffer memory MT_D1 of the decoder DO1 of FIG. 7A. Otherwise, it is decoded on the basis of one or more views already decoded on the decoding pathway determined in a following step.

The decoding step D2a) also comprises a sub-step D22a) in the course of which there is undertaken the dequantization of the digital information obtained subsequent to sub-step D21a), according to a conventional dequantization operation which is the operation inverse to the quantization implemented during the quantization sub-step C14a) of FIG. 1A. A set $VDq_{u,j}$ of dequantized coefficients is then obtained on completion of sub-step D22a). Such a sub-step D22a) is implemented by a dequantization device $MQ^{-1}$_D1 of the view decoding device MDV_D1 of FIG. 7A.

The decoding step D2a) also comprises a sub-step D23a) in the course of which there is undertaken a transformation of the set $VDq_{u,j}$ of dequantized coefficients which is of $DCT^{-1}$, $DST^{-1}$ or $DWT^{-1}$ type. This transformation is the operation inverse to the transformation performed in sub-step C13a) of FIG. 1A. On completion of sub-step D23a), at least the decoded current residual view is obtained, which view is designated by the reference $VDr_{u,j}$. Such an operation is performed by a device $MT^{-1}$_D1 for an inverse transformation of $DCT^{-1}$ (the abbreviation standing for "Discrete Cosine Transform"), $DST^{-1}$ (the abbreviation standing for "Discrete Sine Transform"), $DWT^{-1}$ (the abbreviation standing for "Discrete Wavelet Transform") type. The transformation device $MT^{-1}$_D1 belongs to the view decoding device MDV_D1 of FIG. 7A.

According to the invention, in the course of the decoding step D2a), there is undertaken a sub-step D24a) of determining, in a set of views which belong to the current multi-view image $IMV_j$ or else to another multi-view image of the sequence, at least one pathway of views that are necessary for the decoding of said at least one current view $V_{u,j}$. Said at least one pathway comprises at least one as yet undecoded view, designated by the reference $Vnd_i$. Such an operation is performed by a calculation device CAL1_D1 belonging to the view decoding device MDV_D1 of FIG. 7A.

According to the invention, in the course of a sub-step D25a) represented in FIG. 6A, there is undertaken the decoding of the at least one as yet undecoded view $Vnd_i$ situated on the determined pathway.

As has already been explained previously, as a function of the coding data of the at least one as yet undecoded view $Vnd_i$ which may either be inscribed in the data signal F1, if the at least one view $Vnd_i$ belongs to the current multi-view image $IMV_j$, or in another data signal representative of another multi-view image of the sequence, if the at least one view $Vnd_i$ belongs to this other multi-view image, the at least one as yet undecoded view $Vnd_i$ will be, depending on the case:

Intra decoded, decoded with reference to at least one previously decoded view of said multi-view image $IMV_j$, decoded with reference to at least one previously decoded view of another multi-view image of the sequence, said at least one previously decoded view representing the scene from the same angular viewing position as the at least one as yet undecoded view $Vnd_i$ or from a different angular viewing position.

In a manner known as such, the following operations are undertaken:

entropy decoding of the data representative of the at least one as yet undecoded view $Vnd_i$, delivering associated digital information, dequantization of this associated information, delivering dequantized coefficients, inverse transformation of the dequantized coefficients, delivering at least one decoded residual view $VDrnd_i$, and in the case where the Inter prediction mode has been applied, addition of the at least one decoded residual view $VDrnd_i$ to the at least one previously decoded view of said multi-view image IMVj or of another multi-view image of the sequence.

On completion of these operations, at least one decoded view $VDnd_i$ is obtained.

According to the invention, in the course of a sub-step D26a) represented in FIG. 6A, there is undertaken the construction (otherwise called inverse prediction) of the at least one decoded current view $VD_{u,j}$ by adding to the at least one decoded current residual view $VDr_{u,j}$ obtained on completion of sub-step D23a) the at least one decoded view $VDnd_i$ which has been obtained in the aforementioned sub-step D25a).

Such a sub-step D26a) is implemented by a calculation device CAL2_D1 belonging to the view decoding device MDV_D1 of FIG. 7A.

The at least one decoded current view $VD_{u,j}$ is then delivered by the output SOR_D1 of the decoder DO1, and then is stored in the buffer memory MT_D1 so as to be used for the decoding of a next view to be decoded.

Figure 8A:
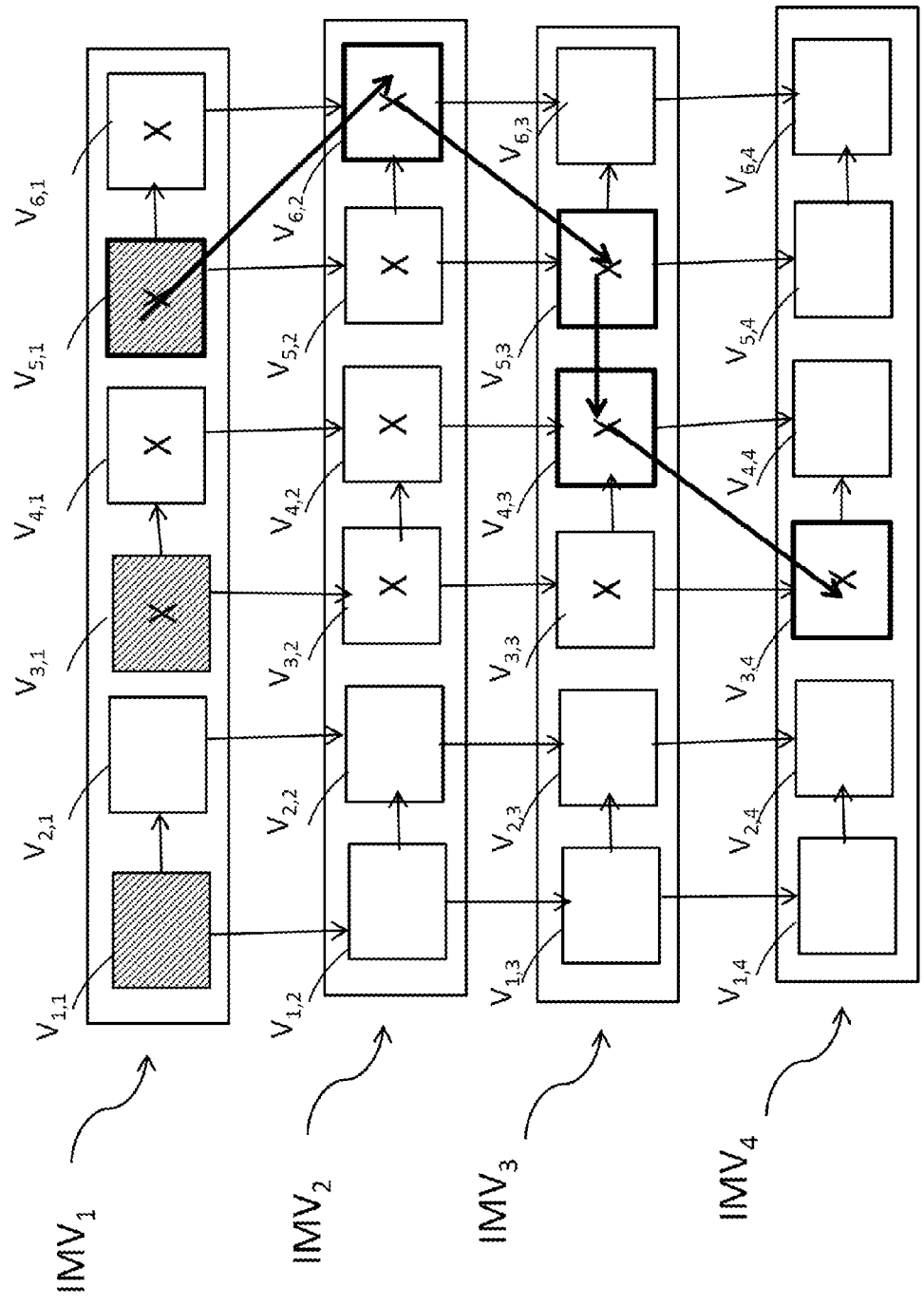
FIG. 8A represents an exemplary decoding pathway associated with the at least one current view to be decoded, which has been coded in accordance with the coding tree of FIG. 5A.

With reference now to FIG. 8A, there is represented an exemplary decoding of at least one current view $V_{u,j}$ such as coded with reference to FIG. 5A.

In the example represented, each current view considered is the one that a user chooses to request successively during his navigation from one view to another in the sequence of multi-view images $IMV_1$ to $IMV_4$. For example, this entails views $V_{5,1}$, $V_{6,2}$, $V_{5,3}$, $V_{4,3}$ and then $V_{3,4}$. Such a navigation pathway is represented in bold in FIG. 8A.

a) Let us now consider the first current view $V_{5,1}$ to be decoded. This view is Intra decoded (represented by hatching in FIG. 8A), that is to say decoded without reference to other views. The method according to the invention does not therefore apply in respect of the current view $V_{5,1}$ considered. Once decoded, the view $V_{5,1}$ is stored in the memory MT_D1 of the decoder of FIG. 7A, with a view to being used for the decoding of next views.

b) Let us now consider the second current view $V_{6,2}$ to be decoded. According to the invention, there is determined a decoding pathway for the current view $V_{6,2}$ which contains the reference views $V_{6,1}$ and $V_{5,2}$ which have not yet been decoded and which are necessary for the decoding of the current view $V_{6,2}$.

The view $V_{6,1}$ is decoded with reference to the previously decoded view $V_{5,1}$.

The view $V_{5,2}$ is decoded with reference to the previously decoded view $V_{5,1}$.

The current view $V_{6,2}$ is then decoded with reference to the decoded views $V_{6,1}$ and $V_{5,2}$. Once decoded, the views $V_{6,1}$, $V_{5,2}$ and $V_{6,2}$ are stored in the memory MT_D1 of the decoder of FIG. 7A, with a view to being used for the decoding of next views.

c) Let us now consider the third current view $V_{5,3}$ to be decoded. This view is decoded with reference to the view $V_{5,2}$. However, the view $V_{5,2}$ has already been decoded previously. The decoding method according to the invention does not therefore apply in respect of the current view $V_{5,3}$ considered. Once decoded, the view $V_{5,3}$ is stored in the memory MT_D1 of the decoder of FIG. 7A, with a view to being used for the decoding of next views.

d) Let us now consider the fourth current view $V_{4,3}$ to be decoded. According to the invention, there is determined a decoding pathway for the current view $V_{4,3}$ which contains the reference views $V_{4,2}$ and $V_{3,3}$ which have not yet been decoded and which are necessary for the decoding of the current view $V_{4,3}$. The decoding pathway furthermore contains the reference view $V_{3,2}$ which likewise has not yet been decoded and which is necessary for the decoding of the views $V_{3,3}$ and $V_{4,2}$, the reference view $V_{4,1}$ which likewise has not yet been decoded and which is necessary for the decoding of the view $V_{4,2}$, as well as the reference view $V_{3,1}$ which likewise has not yet been decoded and which is necessary for the decoding of the views $V_{4,1}$ and $V_{3,2}$. Once the decoding pathway has been determined:

the view $V_{3,1}$ is Intra decoded (represented by hatching in FIG. 8A), that is to say decoded without reference to other views. Once decoded, the view $V_{3,1}$ is stored in the memory MT_D1 of the decoder of FIG. 7A, with a view to being used for the decoding of next views;

the view $V_{4,1}$ is decoded with reference to the previously decoded view $V_{3,1}$ and then is stored in the memory MT_D1 of the decoder of FIG. 7A, with a view to being used for the decoding of next views;

the view $V_{3,2}$ is decoded with reference to the previously decoded view $V_{3,1}$ and then is stored in the memory MT_D1 of the decoder of FIG. 7A, with a view to being used for the decoding of next views;

the view $V_{4,2}$ is decoded with reference to the previously decoded views $V_{4,1}$ and $V_{3,2}$ and then is stored in the memory MT_D1 of the decoder of FIG. 7A, with a view to being used for the decoding of next views;

the view $V_{3,3}$ is decoded with reference to the previously decoded view $V_{3,2}$ and then is stored in the memory MT_D1 of the decoder of FIG. 7A, with a view to being used for the decoding of next views.

The current view $V_{4,3}$ is then decoded with reference to the decoded views $V_{4,2}$ and $V_{3,3}$. Once decoded, the view $V_{4,3}$ is stored in the memory MT_D1 of the decoder of FIG. 7A, with a view to being used for the decoding of next views.

e) Let us now consider the fifth current view $V_{3,4}$ to be decoded. This view is decoded with reference to the view $V_{3,3}$ which is itself decoded with reference to the view $V_{3,2}$ which is itself decoded with reference to the view $V_{3,1}$.

However, the views $V_{3,1}$ and $V_{3,2}$ have already been decoded previously. The decoding method according to the invention does not therefore apply in respect of the current view $V_{3,4}$ considered. Once decoded, the view $V_{3,4}$ is stored in the memory MT_D1 of the decoder of FIG. 7A, with a view to being used for the decoding of next views.

Thus, by virtue of the aforementioned determination of the decoding pathway, when the view $V_{3,4}$ has been decoded, only 12 views of the sequence have been decoded in comparison with the 24 views necessarily decoded by conventional decoders. These are views $V_{3,1}$, $V_{4,1}$, $V_{5,1}$, $V_{6,1}$, $V_{3,2}$, $V_{4,2}$, $V_{5,2}$, $V_{6,2}$, $V_{3,3}$, $V_{4,3}$, $V_{5,3}$, $V_{3,4}$ which are for this purpose signaled in FIG. 8A by a cross "X".

DETAILED DESCRIPTION OF A SECOND EMBODIMENT

According to a second embodiment, the decoding technique according to the invention relies on an innovative method for coding multi-view images, such as implemented by modifications of a coder in accordance with any one of the current or forthcoming video coding standards.

Coding

Figure 1B:
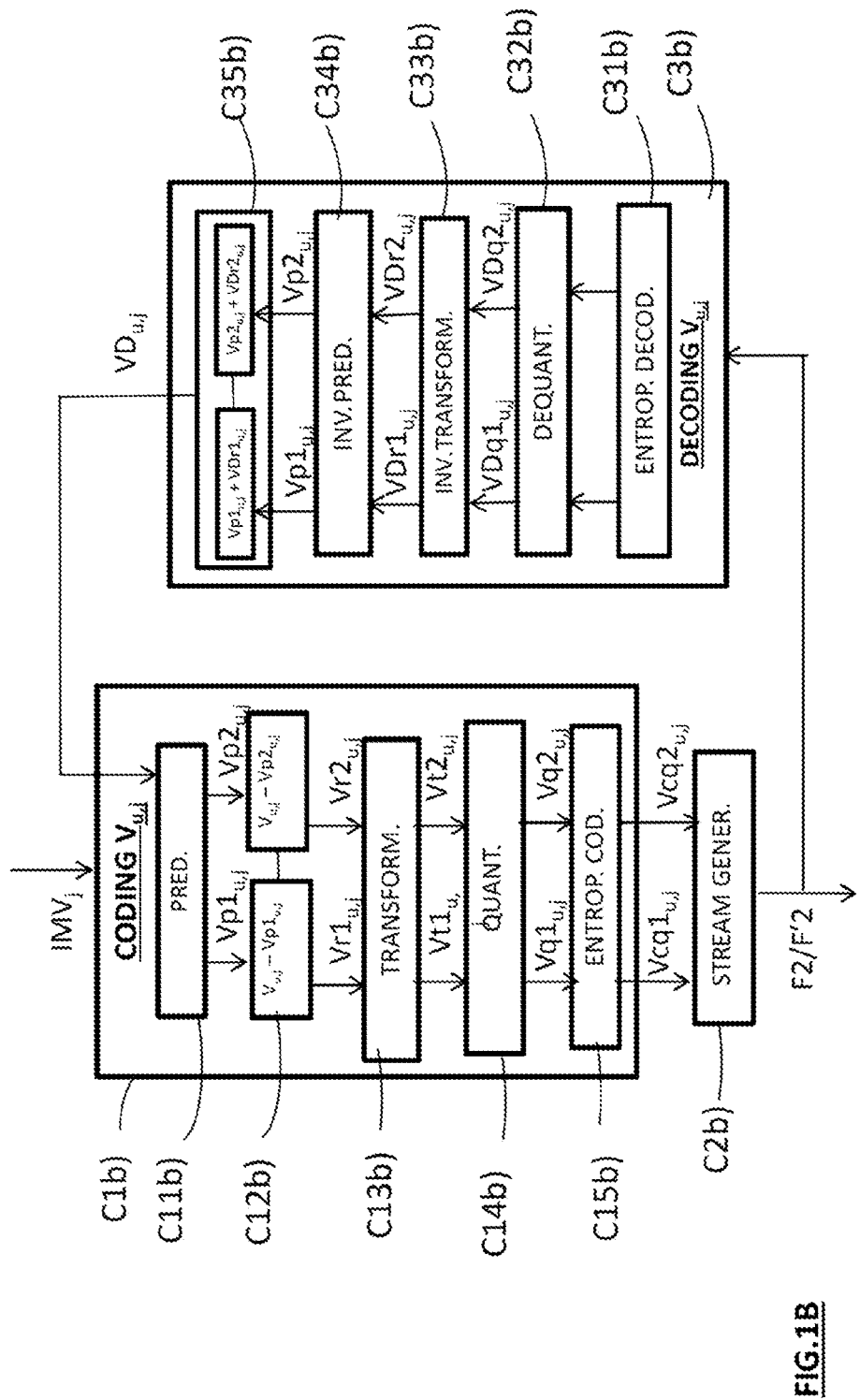
FIG. 1B represents the steps of the coding method according to a second embodiment of the invention.

The coding method in accordance with the second embodiment is represented in the form of an algorithm comprising steps C1b) to C3b) such as represented in FIG. 1B.

Figure 2B:
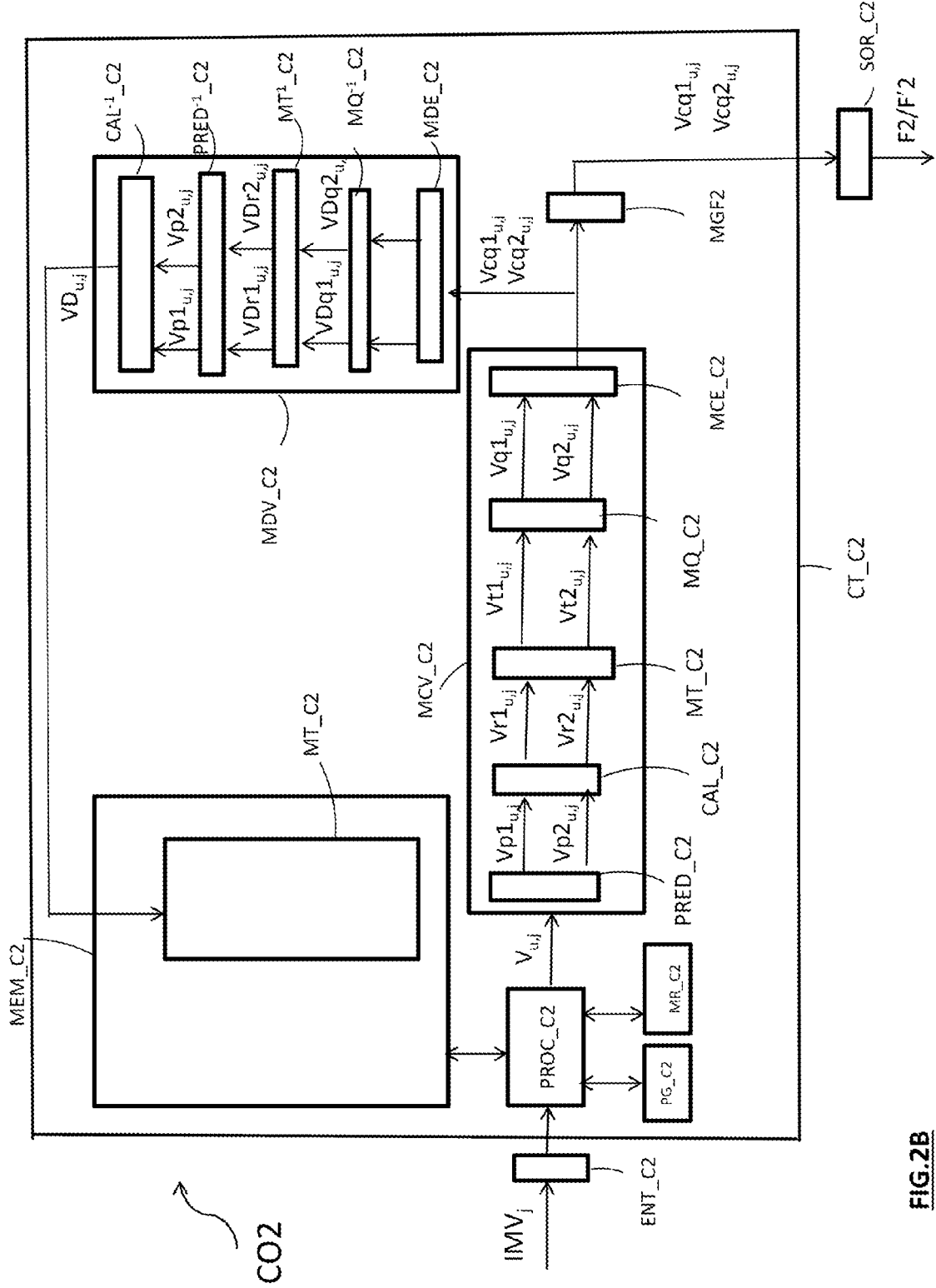
FIG. 2B represents a coding device implementing the coding method of FIG. 1B.

According to the second embodiment of the invention, the coding method is implemented in a coding device or coder CO2 represented in FIG. 2B.

As illustrated in FIG. 2B, such a coder device comprises:
an input ENT_C2 for receiving a current multi-view image to be coded,
a processing circuit CT_C2 for implementing the coding method according to the second embodiment, the processing circuit CT_C2 containing:
  a memory MEM_C2 comprising a buffer memory MT_C2,
  a processor PROC_C2 driven by a computer program PG_C2,
an output SOR_C2 for delivering a coded stream containing the data obtained on completion of the coding of the current multi-view image.

On initialization, the code instructions of the computer program PG_C2 are for example loaded into a RAM memory, MR_C2, before being executed by the processing circuit CT_C2.

The coding method represented in FIG. 1B applies to any current multi-view image $IMV_j$ which is a still image such as represented in FIG. 3A or else which forms part of a sequence of multi-view images $IMV_1, \ldots, IMV_j, \ldots, IMV_K$ ($1 \leq j \leq K$) to be coded, such as represented in FIG. 3B.

In the course of a step C1b) represented in FIG. 1B, for a current multi-view image $IMV_j$, there is undertaken the coding of said at least one view $V_{u,j}$.

Such a step C1b) is implemented by a views coding device MCV_C2 such as represented in FIG. 2B.

Such a views coding device MCV_C2 conventionally comprises:
a prediction device PRED_C2,
a device CAL_C2 for calculating residual data,
a device MT_C2 for a transformation of DCT, DST, DWT type,
a quantization device MQ_C2,
an entropy coding device MCE_C2 for example of CABAC type or else a Huffman coder known as such.

In the course of step C1b), in accordance with the invention there is undertaken a sub-step C11b) of predicting said at least one current view $V_{u,j}$ with respect to a first view and with respect to at least one second view, according to known techniques of intra and/or inter prediction. For this purpose, said at least one current view $V_{u,j}$ is predicted in accordance with a first mode of prediction and with at least one second mode of prediction which are selected from among a plurality of predetermined modes of prediction. According to the coding context, the first and at least second modes of prediction may be identical or different. For example, in the case of a coding of MVC type, and as already explained previously, said at least one current view $V_{u,j}$ can be predicted:
independently of the other views of the multi-view image $IMV_j$ or of the sequence of K of multi-view images $IMV_1, IMV_2, \ldots, IMV_j, \ldots, IMV_K$,
with respect to another view of the current multi-view image $IMV_j$,
with respect to a view belonging to a multi-view image other than said current multi-view image and representing the scene from the same angular viewing position as said at least one current view,
with respect to a multi-view image other than said current multi-view image $IMV_j$ and representing the scene from a different angular viewing position from that of said at least one current view.

The at least two predictor views used to predict said at least one current view $V_{u,j}$ are views which have already been coded and then decoded. The at least two predictor views are stored beforehand in the buffer memory MT_C2 of the coder CO2 such as represented in FIG. 2B.

For the at least one current view $V_{u,j}$ to be coded, at least two optimal predictor views $Vp1_{u,j}$ and $Vp2_{u,j}$ are obtained subsequent to said predetermined modes of prediction being set into competition, for example by minimizing a distortion bitrate criterion well known to the person skilled in the art. Each of the at least two optimal predictor views $Vp1_{u,j}$ and $Vp2_{u,j}$ is considered to be one and the same approximation of said at least one current view $V_{u,j}$ considered.

Such a sub-step C11b) is implemented by the prediction device PRED_C2 represented in FIG. 2B.

The coding step C1b) also comprises a sub-step C12b) in the course of which there is undertaken the calculation of the difference between said at least one current view $V_{u,j}$ and, according to the invention, each of the at least two optimal predictor views $Vp1_{u,j}$ and $Vp2_{u,j}$ which have been selected on completion of sub-step C11b).

At least two residual views $Vr1_{u,j}$ and $Vr2_{u,j}$ are then obtained on completion of sub-step C12b).

Such a sub-step C12b) is implemented by the calculation device CAL_C2 represented in FIG. 2B.

The coding step C1b) also comprises a sub-step C13b) in the course of which there is undertaken the transformation of the at least two residual views $Vr1_{u,j}$ and $Vr2_{u,j}$ according to a conventional direct transformation operation such as for example a transformation of DCT, DST or DWT type, so as to produce according to the invention at least two transformed views, designated respectively by the references $Vt1_{u,j}$ and $Vt2_{u,j}$. Such an operation is performed by the device MT_C2 represented in FIG. 2B.

The coding step C1b) also comprises a sub-step C14b) in the course of which there is undertaken the quantization of the at least two transformed views $Vt1_{u,j}$ and $Vt2_{u,j}$ according to a conventional quantization operation, such as for example a scalar or vector quantization. According to the invention, at least two sets $Vq1_{u,j}$ and $Vq2_{u,j}$ of quantized coefficients are then obtained on completion of this sub-step. Such a sub-step C14b) is implemented by means of the quantization device MQ_C2 such as represented in FIG. 2B.

The coding step C1b) also comprises a sub-step C15b) in the course of which there is undertaken conventionally the coding of the at least two sets $Vq1_{u,j}$ and $Vq2_{u,j}$ of coefficients, according to a predetermined order. According to the invention, at least two sets $Vcq1_{u,j}$ and $Vcq2_{u,j}$ of coded data are then obtained on completion of sub-step C15b).

In the preferred embodiment, the coding performed is an entropy coding of arithmetical or Huffman type. Sub-step C15b) then consists in:
  reading the symbol or symbols of a predetermined set of symbols which are associated with the at least two sets $Vq1_{u,j}$ and $Vq2_{u,j}$ of quantized coefficients considered for said at least one view $V_{u,j}$,
  associating digital information, such as bits, with the symbol(s) read.

Such an entropy coding sub-step C15b) is implemented by the entropy coding device MCE_C2 represented in FIG. 2B.

On completion of the step C1b) of coding the view $V_{u,j}$, there is undertaken, in the course of a step C2b) represented in FIG. 1B, the formulation of a data signal F2 which, as represented in FIG. 4C, comprises according to the invention:
  a field $CH'_{11}$ containing the type of prediction (inter or intra) applied a first time in sub-step C11b) of FIG. 1B, and if relevant, the prediction mode selected,
  if the Inter prediction mode has been applied, a field $CH'_{21}$ containing the index of the first predictor view $Vp1_{u,j}$ selected on completion of sub-step C11b) and the motion vector used $MVp1_{u,j}$,
  a field $CH'_{31}$ containing the first set of the entropically coded data $Vcq1_{u,j}$ associated with said at least one current view $V_{u,j}$,
  a field $CH'_{12}$ containing the type of prediction (inter or intra) applied at least one second time in sub-step C11b) of FIG. 1B, and if relevant, the prediction mode selected,
  if the Inter prediction mode has been applied, a field $CH'_{22}$ containing the index of the at least second predictor view $Vp2_{u,j}$ selected on completion of sub-step C11b) and the motion vector used $MVp2_{u,j}$,
  a field $CH'_{32}$ containing at least the second set of entropically coded data $Vcq2_{u,j}$ associated with said at least one current view $V_{u,j}$.

Such a signal is thereafter delivered via the output SOR_C2 of the coder CO2 of FIG. 2B, and then transmitted by a communication network (not represented), to a remote terminal. The latter comprises a decoder which will be described in greater detail subsequently in the description.

Step C2b) of producing such a signal is implemented by the data signal generation device MGF2, such as represented in FIG. 2B.

According to an innovative variant embodiment specific to the invention, for each of the views of the sequence of images considered, or for each of the views of a subset of views of the sequence of images considered, said views having themselves been coded according to an intra or inter prediction mode, it is proposed to signal in a particular field of the signal F'2:
  either an item of information representative of the fact that the view considered in the sequence of images has been Intra coded,
  or an item of information representative of the index of the at least one predictor view which has been used to predict the view considered in the sequence of images.

In the example represented in FIG. 4D, where, for simplification reasons, only a portion of the signal F'2 is represented, in which portion is signaled only a subset of views of the sequence of images considered, which subset contains said at least one current view $V_{u,j}$ which has been coded, as well as a number W of views $VR_1, \ldots, VR_W$ which have been coded before said at least one current view $V_u$, said first view $VR_1$ having been coded in intra mode and the other views $VR_2$ to $VR_W$ having each been coded for example in inter mode with respect to at least one corresponding predictor view $VpR_2$ to $VpR_W$. It is also assumed that said at least one current view $V_{u,j}$ has been inter coded with respect to a first view $VR_{W1}$ of the sequence of images considered and to at least one second view $VR_{W2}$ of the sequence of images considered.

According to the variant embodiment represented, the portion of the signal F'2 advantageously comprises a field $CH'_{101}$ containing a first item of information, designated for example by the symbol φ, and representative of the fact that the first view $VR_1$ of the subset of views of the sequence of images considered has been intra coded, the index $pR_2$ of at least the view $VpR_2$ which has served for the prediction of the view $VR_2$, the index $pR_{W1}$ of at least the view $VpR_{W1}$ which has served for the prediction of the view $VR_{W1}$, the index $pR_{W2}$ of at least the view $VpR_{W2}$ which has served for the prediction of the view $VR_{W2}$, the index $R_{W1}$ of said first predictor view $VR_{W1}$ which can serve for the prediction of said at least one current view $V_{u,j}$, the index $R_{W2}$ of said at least second predictor view $VR_{W2}$ which can serve for the prediction of said at least one current view $V_{u,j}$. The indices $R_{W1}$ and $R_{W2}$ are grouped together in the field $CH'_{101}$ and separated by the symbol '/' to signal that one of them only is selected as a function of the choice of the predictor view $VR_{W1}$ or $VR_{W2}$ which is implemented to predict said at least one current view $V_{u,j}$.

In accordance with this variant, there is then undertaken, in the course of step C2b) represented in FIG. 1B, the formulation of a portion of the data signal F'2, which portion is specifically associated with the coding of said at least one current view $V_{u,j}$.

Such a formulation consists in adding to the signal F'2, in a similar manner to FIG. 4C:
  a field $CH'_{31}$ containing the inter prediction type associated with said at least one current view $V_{u,j}$, the motion vector $MVp1_{u,j}$ describing the motion between the first predictor view $VR_{W1}$ and said at least one current view $V_{u,j}$, the set of the entropically coded data $Vcq1_{u,j}$ associated with said at least one current view $V_{u,j}$,
  a field $CH'_{32}$ containing the inter prediction type associated with said at least one current view $V_{u,j}$, the motion vector $MVp2_{u,j}$ describing the motion between the at least second predictor view $VR_{W2}$ and said at least one current view $V_{u,j}$, the set of the entropically coded data $Vcq2_{u,j}$ associated with said at least one current view $V_{u,j}$.

The fields $CH'_{31}$ and $CH'_{32}$ get added to the following fields already present in the signal F'2:
  the field $CH'_{111}$ added previously during the coding of the first view $VR_1$ of the subset of views of the sequence of images considered and containing the type of prediction associated with this view, as well as the set of the entropically coded data $Vcq_1$ associated with this view,
  the field $CH'_{112}$ added previously during the coding of the second view $VR_2$ of the subset of views of the sequence of images considered and containing the type of prediction (inter) associated with this view, the motion vector $MVR_2$ describing the motion between the at least one predictor view $VpR_2$ and the view $VR_2$, the set of the entropically coded data $VcqR_2$ associated with the view $VR_2$,

. . . , a field $CH'_{W1}$ added previously during the coding of the view $VR_{W1}$ of the subset of views of the sequence of images considered and containing the type of prediction (inter) associated with the view $VR_{W1}$, the motion vector $MVR_{W1}$ describing the motion between the at least one predictor view $VpR_{W1}$ and the view $VR_{W1}$, the set of the entropically coded data $VcqR_{W1}$ associated with the view $VR_{W1}$, a field $CH'_{W2}$ added previously during the coding of the view $VR_{W2}$ of the subset of views of the sequence of images considered and containing the type of prediction (inter) associated with the view $VR_{W2}$ of the sequence of images considered, the motion vector $MVR_{W2}$ describing the motion between the at least one predictor view $VpR_{W2}$ and the view $VR_{W2}$, the set of the entropically coded data $VcqR_{W2}$ associated with the view $VR_{W2}$.

According to one embodiment, such a formulation consists furthermore in adding to the signal F'2, in the field $CH'_{101}$, as a supplement to the predictor view indices $pR_2, \ldots, pR_{W1}, pR_{W2}$ already present in the field $CH'_{101}$, the index $R_{W1}$ of the first predictor view $VR_{W1}$ which has served for the prediction of said at least one current view $V_{u,j}$ and the index $R_{W2}$ of the at least second predictor view $VR_{W2}$ which has served for the prediction of said at least one current view $V_{u,j}$.

According to another embodiment, the addition of the indices $R_{W1}$ and $R_{W2}$ is not necessary in the case where these indices are already present in the field $CH'_{101}$. According to this other embodiment, the field $CH'_{101}$ has been supplemented with all the indices of the predictor views of the views of the subset of views considered, prior to the coding of these views.

By virtue of the presence of the field $CH'_{101}$, the coding dependencies associated with said at least one current view $V_{u,j}$ are indicated in a grouped-together manner in the signal F'2 and will thus be rendered accessible rapidly and directly during the decoding of said at least one current view $V_{u,j}$.

In a manner known per se, in the course of a step C3b) represented in FIG. 1B, there is undertaken the decoding of said at least one current view $V_{u,j}$.

Such a step C3b) is implemented by a view decoding device MDV_C2 such as represented in FIG. 2B.

Such a view decoding device MDV_C2 conventionally comprises:
- an entropy decoding device MDE_C2, for example of CABAC type or else a Huffman decoder known as such,
- a dequantization module $MQ^{-1}$_C2,
- a module $MT^{-1}$_C2 for an inverse transformation of $DCT^{-1}$, $DST^{-1}$, $DWT^{-1}$ type,
- an inverse prediction module $PRED^{-1}$_C2,
- a view reconstruction calculation module $CAL^{-1}$_C2.

In the course of step C3b), according to the invention, there is undertaken a sub-step C31b) of entropy decoding of the at least two sets of entropically coded data $Vcq1_{u,j}$ and $Vcq2_{u,j}$ which are associated with said at least one current view $V_{u,j}$. In the preferred embodiment, the decoding performed is an entropy decoding of arithmetical or Huffman type. Sub-step C31b) then consists in:

reading the symbol or symbols of a predetermined set of symbols which are associated with each of the sets of entropically coded data $Vcq1_{u,j}$ and $Vcq2_{u,j}$ of said at least one current view $V_{u,j}$, associating digital information, such as bits, with the symbol(s) read.

On completion of the aforementioned sub-step C31b), a plurality of digital information items is obtained, which items are associated according to the invention with at least two sets of quantized data $Vcq1_{u,j}$ and $Vcq2_{u,j}$ which have been coded in the course of the aforementioned step C15b).

Such an entropy decoding sub-step C31b) is implemented by the entropy decoding device MDE_C2 represented in FIG. 2B.

In the course of the aforementioned sub-step C31b), there is also decoded the index of the first predictor view $Vp1_{u,j}$ and of the at least second predictor view $Vp2_{u,j}$ which have been used to predict said at least one current view $V_{u,j}$ in sub-step C11b) of FIG. 1B.

The coding step C3b) also comprises a sub-step C32b) in the course of which there is undertaken the dequantization of the digital information obtained subsequent to sub-step C31b), according to a conventional dequantization operation which is the operation inverse to the quantization implemented in sub-step C14b). At least two sets $VDq1_{u,j}$ and $VDq2_{u,j}$ of dequantized coefficients are then obtained on completion of this sub-step. Such a sub-step C32b) is implemented by the dequantization device $MQ^{-1}$_C2 such as represented in FIG. 2B.

The coding step C3b) also comprises a sub-step C33b) in the course of which there is undertaken a transformation of each of the at least two sets $VDq1_{u,j}$ and $VDq2_{u,j}$ of dequantized coefficients, which is of $DCT^{-1}$, $DST^{-1}$ or $DWT^{-1}$ type. This transformation is the operation inverse to the transformation performed in sub-step C13b). On completion of this sub-step, in accordance with the invention, at least two decoded residual views are obtained, such as the views designated respectively by the references $VDr1_{u,j}$ and $VDr2_{u,j}$. Such an operation is performed by the device $MT^{-1}$_C2 represented in FIG. 2B.

The coding step C3b) also comprises a sub-step C34b) of predicting said at least one current view $V_{u,j}$ to be decoded, by selecting, in the buffer memory MT_C2 of FIG. 2B, one or the other of the at least two optimal predictor views $Vp1_{u,j}$ and $Vp2_{u,j}$ which have been obtained subsequent to the aforementioned sub-step C11b) and which are respectively associated with the two decoded indices on completion of sub-step C31b).

Such a sub-step C34b) is implemented by the prediction device $PRED^{-1}$_C2 represented in FIG. 2B.

The coding step C3b) also comprises a calculation sub-step C35b), in the course of which there is undertaken the construction (otherwise called inverse prediction) of said at least one decoded view $VD_{u,j}$ by adding to one or the other of the at least two decoded residual views $VDr1_{u,j}$ and $VDr2_{u,j}$ obtained on completion of sub-step C33b), respectively one or the other of the at least two predictor views $Vp1_{u,j}$ and $Vp2_{u,j}$ which have been identified in the aforementioned sub-step C31b).

Such a sub-step C35b) is implemented by the calculation device $CAL^{-1}$_C2 represented in FIG. 2B.

The coding steps C1b) to C3b) which have just been described hereinabove are thereafter implemented for each of the views $V_{u,1}, V_{u,2}, \ldots, V_{u,N}$ to be coded of the current multi-view image $IMV_j$ considered.

With reference now to FIG. 5B, there is represented an exemplary coding of at least one current view $V_{u,j}$ in accordance with the coding method of FIG. 1B. In the example represented, the current multi-view image $IMV_j$ is the fourth image $IMV_4$ of a sequence of multi-view images, each multi-view image comprising for example six views. The at least one coded current view which is considered in this example is for example the third view $V_{3,4}$ of the current multi-view image $IMV_4$. The view $V_{3,4}$ is represented in bold in FIG. 5B.

In the example represented, the current view $V_{3,4}$ is coded in Inter mode on the basis of the view $V_{2,3}$ or of the view $V_{3,3}$ of the multi-view image $IMV_3$.

a) When the current view $V_{3,4}$ is coded on the basis of the view $V_{2,3}$, the view $V_{2,3}$ is itself coded on the basis of the view $V_{1,2}$, $V_{2,2}$ or $V_{3,2}$. If the view $V_{1,2}$ is used to code the view $V_{2,3}$, the view $V_{1,2}$ is itself coded on the basis of the Intra coded view $V_{1,1}$, this mode being represented by hatching in FIG. 5B, or else of the view $V_{2,1}$. If the view $V_{1,2}$ is coded on the basis of the view $V_{2,1}$, the latter is itself coded with respect to the view $V_{1,1}$. If the view $V_{2,2}$ is used to code the view $V_{2,3}$, the view $V_{2,2}$ is itself coded on the basis of the view $V_{1,1}$ or of the view $V_{2,1}$ or of the view $V_{3,1}$. If it is the view $V_{2,1}$ which is chosen, the latter is itself coded with respect to the view $V_{1,1}$. If it is the view $V_{3,1}$ which is chosen, the latter is itself coded on the basis of the view $V_{2,1}$ which is itself coded with respect to the view $V_{1,1}$. If the view $V_{3,2}$ is used to code the view $V_{2,3}$, the view $V_{3,2}$ is itself coded on the basis of the view $V_{2,1}$ or of the view $V_{3,1}$. If it is the view $V_{2,1}$ which is chosen, the latter is itself coded with respect to the view $V_{1,1}$. If it is the view $V_{3,1}$ which is chosen, the latter is itself coded on the basis of the view $V_{2,1}$ which is itself coded with respect to the view $V_{1,1}$.

b) When the current view $V_{3,4}$ is coded on the basis of the view $V_{3,3}$, the view $V_{3,3}$ is itself coded on the basis of the view $V_{2,2}$ or $V_{3,2}$. If the view $V_{2,2}$ is used to code the view $V_{3,3}$, the view $V_{2,2}$ is itself coded on the basis of the view $V_{1,1}$ or of the view $V_{2,1}$ or of the view $V_{3,1}$. If it is the view $V_{2,1}$ which is chosen, the latter is itself coded with respect to the view $V_{1,1}$. If it is the view $V_{3,1}$ which is chosen, the latter is itself coded on the basis of the view $V_{2,1}$ which is itself coded with respect to the view $V_{1,1}$. If the view $V_{3,2}$ is used to code the view $V_{3,3}$, the view $V_{3,2}$ is itself coded on the basis of the view $V_{2,1}$ or of the view $V_{3,1}$. If it is the view $V_{2,1}$ which is chosen, the latter is itself coded with respect to the view $V_{1,1}$. If it is the view $V_{3,1}$ which is chosen, the latter is itself coded on the basis of the view $V_{2,1}$ which is itself coded with respect to the view $V_{1,1}$.

The view to view coding dependencies are for their part represented by arrows in FIG. 5B.

According to the second coding embodiment according to the invention, there is therefore proposed, in order to code the current view $V_{3,4}$, an alternate plurality of coding trees, the set of these trees being represented without distinction, in bold in FIG. 5B.

Decoding

A second embodiment of the invention will now be described, in which the decoding method is used to decode at least one current view belonging to a multi-view image which has been previously coded in accordance with the coding method of FIG. 1B and whose coded data are contained in the data signal F2 or F'2. Said at least one current view is able to be decoded by a decoder in accordance with any one of the current or forthcoming video decoding standards.

The decoding method according to the second embodiment of the invention is for example implemented in a software or hardware manner by modifications of such a decoder.

Figure 6B:
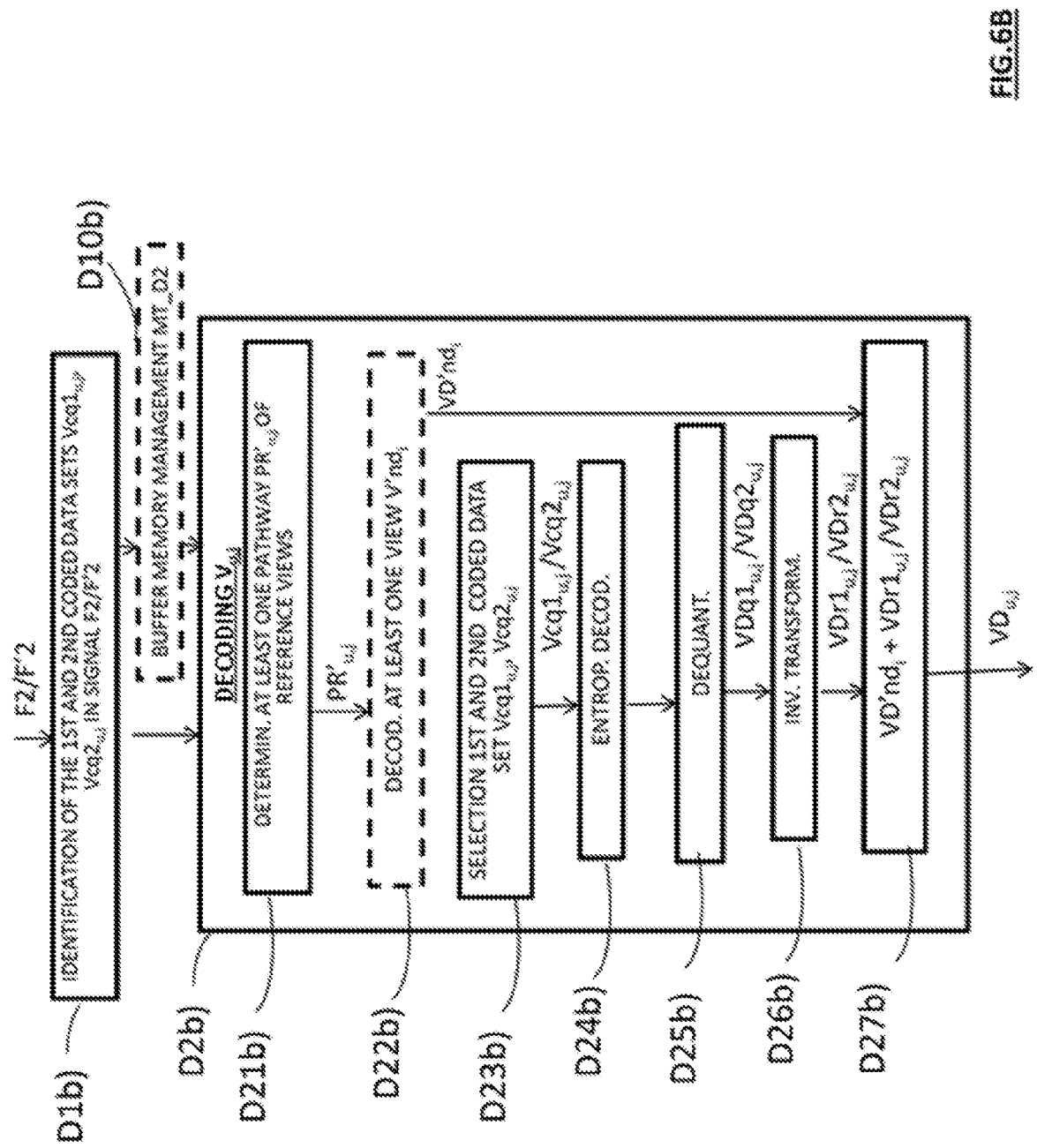
FIG. 6B represents the steps of the decoding method according to a second embodiment of the invention.

The decoding method according to the invention is represented in the form of an algorithm comprising steps D1b) to D2b) such as represented in FIG. 6B.

Figure 7B:
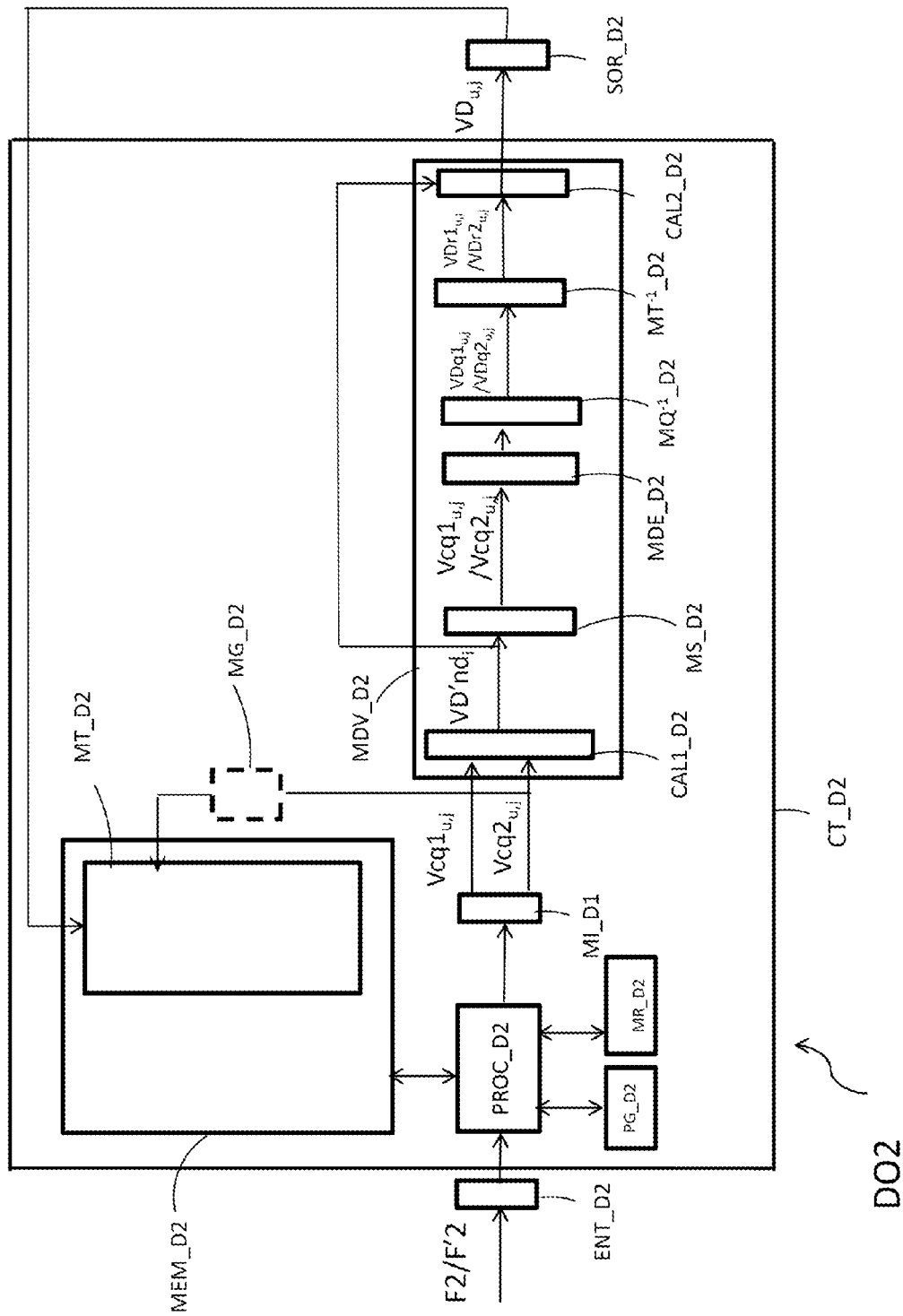
FIG. 7B represents a decoding device implementing the decoding method of FIG. 6B.

According to this first embodiment, the decoding method according to the invention is implemented in a decoding device or decoder DO2 represented in FIG. 7B.

As illustrated in FIG. 7B, such a decoder device comprises:

an input ENT_D2 for receiving the data signal F2 or F'2 representative of the current multi-view image which has been previously coded, a processing circuit CT_D2 for implementing the decoding method according to the invention, the processing circuit CT_D2 containing:

a memory MEM_D2 comprising a buffer memory MT_D2, a processor PROC_D2 driven by a computer program PG_D2, an output SOR_D2 for delivering at least one reconstructed current view containing the data obtained on completion of the decoding according to the second embodiment.

On initialization, the code instructions of the computer program PG_D2 are for example loaded into a RAM memory, MR_D2, before being executed by the processing circuit CT_D2.

The decoding method represented in FIG. 6B applies to any current view $V_{u,j}$ of a current multi-view image $IMV_j$ which is a still image or else forms part of a sequence of multi-view images $IMV_1, \ldots, IMV_j, \ldots, IMV_K$ ($1 \le j \le K$).

For this purpose, information representative of said at least one current view $V_{u,j}$ to be decoded are identified:

either in the corresponding portion, represented in FIG. 4C, of the data signal F2 received at the decoder and such as delivered subsequent to the coding method of FIG. 1B, or in the corresponding portion, represented in FIG. 4D, of the data signal F'2 received at the decoder and such as delivered subsequent to the coding method of FIG. 1B.

In the course of a step D1b) represented in FIG. 6B, there is undertaken, in a manner known per se, the identification, in the corresponding portion of the data signal F2:

of the at least first and second data sets $Vcq1_{u,j}$ and $Vcq2_{u,j}$ associated with said at least one current view $V_{u,j}$, such as coded entropically subsequent to the coding sub-step C15b) of FIG. 1B and contained respectively in the fields $CH'_{31}$ and $CH'_{32}$ of the data signal F2 represented in FIG. 4C, of the item of information for identifying the at least two predictor views $Vp1_{u,j}$ and $Vp2_{u,j}$ obtained subsequent to the prediction sub-step C11b) of the coding method represented in FIG. 1B and contained respectively in the fields $CH'_{21}$ and $CH'_{22}$ of the data signal F2 represented in FIG. 4C, such an item of information consisting for example in the index of each of the at least two predictor views $Vp1_{u,j}$ and $Vp2_{u,j}$.

According to an innovative variant of step D1b) represented in FIG. 6B, there is undertaken the identification, in the corresponding portion of the data signal F'2 of FIG. 4D:

on the basis respectively of the fields $CH'_{31}$ and $CH'_{32}$, of the at least first and second sets of the data $Vcq1_{u,j}$ and $Vcq2_{u,j}$ associated with said at least one current view $V_{u,j}$, such as coded entropically subsequent to the coding sub-step C15b) of FIG. 1B, on the basis of the field $CH'_{101}$, of the index $R_{W1}$ of the first view $VR_{W1}$ which has served for the prediction of said at least one current view $V_{u,j}$, of the index $R_{W2}$ of the at least second view $VR_{W2}$ which has served for the prediction of said at least one current view $V_{u,j}$ and optionally, if such information is not yet known at the time of the decoding of said at least one current view $V_{u,j}$, the item of information according to which the first view $VR_1$ has been Intra predicted, the index $pR_2$ of at least the view $VpR_2$ which has served for the prediction of the view $VR_2$, ..., the index $pR_{W1}$ of at least the view $VpR_{W1}$ which has served for the prediction of the view $VR_{W1}$, the index $pR_{W2}$ of at least the view $VpR_{W2}$ which has served for the prediction of the view $VR_{W2}$.

The identification step D1b) is implemented by a signal analysis device MI_D2, such as represented in FIG. 7B.

According to the invention, subsequent to step D1b), there is undertaken, in the course of a step D2b) represented in FIG. 6B, the decoding of said at least one entropically coded view $V_{u,j}$.

Such a step D2b) is implemented by a view decoding device MDV_D2 such as represented in FIG. 7B.

According to the invention, in the course of the decoding step D2b), there is undertaken a sub-step D21b) of determining, in a set of views which belong to the current multi-view image $IMV_j$ or else to another multi-view image of the sequence, of at least one pathway $PR'_{u,j}$ of reference views necessary for the decoding of said at least one current view $V_{u,j}$ which, having regard to the alternate coding trees implemented on coding, contains one of the first or at least second predictor views $Vp1_{u,j}$ and $Vp2_{u,j}$. According to a first alternative, said at least one pathway $PR'_{u,j}$ contains only one or more already decoded reference views. According to a second alternative, said at least one pathway $PR'_{u,j}$ comprises at least one as yet undecoded view, designated by the reference V'nd$_i$. Such a pathway determination operation is performed by a calculation device CAL1_D2 belonging to the view decoding device MDV_D2 of FIG. 7B.

If the second alternative has been implemented, in the course of a sub-step D22b) represented in FIG. 6B, there is undertaken the decoding of the at least one as yet undecoded view V'nd$_i$ situated on the determined pathway. Having regard to the fact that this second alternative is not systematically implemented, it is represented dashed in FIG. 6B.

As has already been explained previously, as a function of the coding data of the at least one as yet undecoded view V'nd$_i$ which can either be inscribed in the data signal F2 or F'2 if the at least one view V'nd$_i$ belongs to the current multi-view image $IMV_j$, or in another data signal representative of another multi-view image of the sequence if the at least one view V'nd$_i$ belongs to this other multi-view image, said at least one as yet undecoded view V'nd$_i$ will be, depending on the case:

Intra decoded,
decoded with reference to at least one previously decoded view of said multi-view image $IMV_j$,
decoded with reference to at least one previously decoded view of another multi-view image of the sequence, said at least one previously decoded view representing the scene from the same angular viewing position as said at least one as yet undecoded view V'nd$_i$ or from a different angular viewing position.

In a manner known as such, the following operations are undertaken:
entropy decoding of the data representative of said at least one as yet undecoded view V'nd$_i$, delivering associated digital information,
dequantization of this associated information, delivering dequantized coefficients,
inverse transformation of the dequantized coefficients, delivering at least one decoded residual view VD'rnd$_i$,
and in the case where the Inter prediction mode has been applied, addition of the at least one decoded residual view VD'rnd$_i$ to the at least one previously decoded view of said multi-view image IMVj or of another multi-view image of the sequence.

On completion of these operations, at least one decoded view VD'nd$_i$ is obtained.

In the course of the decoding step D2b), in accordance with the invention, as a function of the geometry of the at least one decoding pathway $PR'_{u,j}$ determined in the previous sub-step, there is undertaken a sub-step D23b) of selecting one of the sets of entropically coded data $Vcq1_{u,j}$ or $Vcq2_{u,j}$ associated with said at least one view $V_{u,j}$ to be decoded.

Such a sub-step D23b) is implemented by a selection device MS_D2 of the view decoding device MDV_D2 of FIG. 7B.

In the course of the decoding step D2b), there is undertaken a sub-step D24b) of entropy decoding of one of the at least two sets of entropically coded data $Vcq1_{u,j}$ or $Vcq2_{u,j}$ associated with said at least view $V_{u,j}$ to be decoded. In the preferred embodiment, the decoding performed is an entropy decoding of arithmetical or Huffman type. Sub-step D24b) then consists in:

reading the symbol or symbols of a predetermined set of symbols which are associated with the set of entropically coded data $Vcq1_{u,j}$ or $Vcq2_{u,j}$ which has been selected,
associating digital information, such as bits, with the symbol(s) read.

On completion of the aforementioned sub-step D24b), a plurality of digital information items is obtained, which items are associated with the set of entropically coded data $Vcq1_{u,j}$ or $Vcq2_{u,j}$ which has been selected.

In the course of step D24b), if it is the signal F2 of FIG. 4C which has been received at the decoder, then the following are also read in the field $CH'_{21}$ or $CH'_{22}$ of the portion of the data signal F2:

the motion vector $MVp1_{u,j}$ or $MVp2_{u,j}$ which has been used in association respectively with the predictor view $Vp1_{u,j}$ or $Vp2_{u,j}$,
the inter or intra prediction type associated with the first or with the second predictor view.

If it is the signal F'2 of FIG. 4D which has been received at the decoder, the following are also read:

in the case where it is the set of entropically coded data $Vcq1_{u,j}$ which is selected, on the basis of the field $CH'_{W1}$ of the portion of the data signal F'2:
the inter prediction type associated with the view $VR_{W1}$ of the sequence of images considered,
the motion vector used $MVR_{W1}$,
in the case where it is the set of entropically coded data $Vcq2_{u,j}$ which is selected, on the basis of the field $CH'_{W2}$ of the portion of the data signal F'2:
the inter prediction type associated with the view $VR_{W2}$ of the sequence of images considered,
the motion vector used $MVR_{W2}$.

Such an entropy decoding sub-step D24b) is implemented by an entropy decoding device MDE_D2 of the view decoding device MDV_D2 of FIG. 7B.

In the course of the aforementioned sub-step D24b), there is also decoded the index of the predictor view $Vp1_{u,j}$ or $Vp2_{u,j}$ which has been used to predict said at least one current view $V_{u,j}$ during sub-step C11b) of FIG. 1B and which is associated with the set of entropically coded data $Vcq1_{u,j}$ or $Vcq2_{u,j}$ which has been selected. The predictor view $Vp1_{u,j}$ or $Vp2_{u,j}$ is a view which has or has not already been decoded. In the case where the predictor view $Vp1_{u,j}$ or $Vp2_{u,j}$ has been decoded, it is stored beforehand in the buffer memory MT_D2 of the decoder DO2 of FIG. 7B. Otherwise, it is decoded on the basis of one or more views already decoded on the pathway determined $PR'_{u,j}$.

The decoding step D2b) also comprises a sub-step D25b) in the course of which there is undertaken the dequantization of the digital information obtained subsequent to sub-step D24b), according to a conventional dequantization operation which is the operation inverse to the quantization implemented during the quantization sub-step C14b) of FIG. 1B. A set $VDq1_{u,j}$ or $VDq2_{u,j}$ of dequantized coefficients is then obtained on completion of sub-step D25b). Such a sub-step D25b) is implemented by a dequantization device $MQ^{-1}\_D2$ of the view decoding device MDV_D2 of FIG. 7B.

The decoding step D2b) also comprises a sub-step D26b) in the course of which there is undertaken a transformation of the set $VDq1_{u,j}$ or $VDq2_{u,j}$ of dequantized coefficients, which is of $DCT^{-1}$, $DST^{-1}$ or $DWT^{-1}$ type. This transformation is the operation inverse to the transformation performed in sub-step C13b) of FIG. 1B. On completion of sub-step D26b), the at least one decoded current residual view is obtained, which view is designated by the reference $VDr1_{u,j}$ or $VDr2_{u,j}$. Such an operation is performed by a device of $MT^{-1}\_D2$ for an inverse transformation of $DCT^{-1}$, $DST^{-1}$, $DWT^{-1}$ type. The transformation device $MT^{-1}\_D2$ belongs to the view decoding device MDV_D2 of FIG. 7B.

According to the invention, in the course of a sub-step D27b) represented in FIG. 6B, there is undertaken the construction (otherwise called inverse prediction) of said at least one decoded view $VD_{u,j}$ by adding to the at least one decoded current residual view $VDr1_{u,j}$ or $VDr2_{u,j}$ obtained on completion of sub-step D26b) said at least one decoded view $VD'nd_i$ which has been obtained in the aforementioned sub-step D22b).

Such a sub-step D27b) is implemented by a calculation device CAL2_D2 belonging to the view decoding device MDV_D2 of FIG. 7B.

Said at least one decoded view $VD_{u,j}$ is then delivered by the output SOR_D2 of the decoder DO2, and then is stored in the buffer memory MT_D2 so as to be used for the decoding of a next view to be decoded.

According to the decoding context, the decoding method according to the second embodiment can be implemented independently of the decoding method according to the first embodiment of FIG. 6A or else be implemented in combination therewith.

With reference now to FIG. 8B, there is represented an exemplary decoding of at least one current view $V_{u,j}$ such as coded with reference to FIG. 5B. In the example represented, each multi-view image comprises for example six views. Furthermore, according to the current view considered:
- a single prediction residual is necessarily used to reconstruct the current view $V_{u,j}$,
- two different prediction residuals can be used alternately to reconstruct a current view $V_{u,j}$,
- three different prediction residuals can be used alternately to reconstruct a current view $V_{u,j}$.

In the example represented, each current view considered is the one that a user chooses to request successively during his navigation from one view to another in the sequence of multi-view images $IMV_1$ to $IMV_4$. For example, these are views $V_{5,1}$, $V_{6,2}$, $V_{5,3}$, $V_{4,3}$ and then $V_{3,4}$. Such a navigation pathway is represented in bold in FIG. 8B.

Let us assume that the at least one current view to be decoded which is considered in this example is for example the first view $V_{5,1}$ that the user wishes to view.

In the example represented, the view $V_{5,1}$ can only be decoded on the basis of the view $V_{4,1}$ which is not yet decoded. The view $V_{4,1}$ is therefore firstly intra decoded (represented by hatching in FIG. 8B), and then stored in the buffer memory MT_D2 of FIG. 7B with a view to being used for the decoding of next views. The view $V_{5,1}$ is then decoded in turn with reference to the previously decoded view $V_{4,1}$, and then stored in the buffer memory MT_D2 of FIG. 7B with a view to being used for the decoding of next views.

Thus, by virtue of the invention, only 2 views of the sequence need to be decoded in comparison with the 6 views of the multi-view image $IMV_1$ which are necessarily decoded by conventional decoders.

Let us now assume that the at least one current view to be decoded which is considered in this example is for example the second view $V_{6,2}$ that the user wishes to view.

In the example represented, the view $V_{6,2}$ can be decoded on the basis of the view $V_{5,1}$ or of the view $V_{6,1}$. Since the user has previously viewed the view $V_{5,1}$ which has therefore been decoded for this purpose and which is therefore available in the buffer memory MT_D2 of FIG. 7B, it is the view $V_{5,1}$ which is preferentially chosen to decode the view $V_{6,2}$.

Thus, by virtue of the invention, only 3 views of the sequence need to be decoded in comparison with the 12 views (6 views of the multi-view image $IMV_1$ and 6 views of the multi-view image $IMV_2$) which are necessarily decoded by conventional decoders.

Let us now assume that the at least one current view to be decoded which is considered in this example is for example the third view $V_{5,3}$ that the user wishes to view.

In the example represented, the view $V_{5,3}$ can be decoded on the basis of the view $V_{4,2}$, of the view $V_{5,2}$ or of the view $V_{6,2}$. Since the user has previously viewed the view $V_{6,2}$ which has therefore been decoded for this purpose and which is therefore available in the buffer memory MT_D2 of FIG. 7B, it is the view $V_{6,2}$ which is preferentially chosen to decode the view $V_{5,3}$.

Thus, by virtue of the invention, only 4 views of the sequence need to be decoded in comparison with the 18 views (6 views of the multi-view image $IMV_1$, 6 views of the multi-view image $IMV_2$ and 6 views of the multi-view image $IMV_3$) which are necessarily decoded by conventional decoders.

Let us now assume that the at least one current view to be decoded which is considered in this example is for example the fourth view $V_{4,3}$ that the user wishes to view.

In the example represented, the view $V_{4,3}$ can be decoded on the basis of the view $V_{4,2}$ or of the view $V_{5,2}$. Since the view $V_{4,1}$ has been previously decoded and is therefore available in the buffer memory MT_D2 of FIG. 7B, it is chosen to decode the view $V_{4,2}$ with respect to the view $V_{4,1}$ and then to decode the view $V_{4,3}$ with respect to the view $V_{4,2}$.

Thus, by virtue of the invention, only 3 views of the sequence need to be decoded in comparison with the 18 views (6 views of the multi-view image $IMV_1$, 6 views of the multi-view image $IMV_2$ and 6 views of the multi-view image $IMV_3$) which are necessarily decoded by conventional decoders.

Let us assume that the at least one current view to be decoded which is considered in this example is for example the fifth view $V_{3,4}$ that the user wishes to view.

In the example represented, the view $V_{3,4}$ can be decoded on the basis of the view $V_{2,3}$ or of the view $V_{3,3}$, the views $V_{2,3}$ and $V_{3,3}$ not yet having been decoded. It is for example chosen to decode the view $V_{2,3}$. In the example represented, the view $V_{2,3}$ can be decoded on the basis of the view $V_{1,2}$, $V_{2,2}$ or $V_{3,2}$, the views $V_{1,2}$, $V_{2,2}$ and $V_{3,2}$ not yet having been decoded. It is for example chosen to decode the view $V_{1,2}$. In the example represented, the view $V_{1,2}$ can be decoded on the basis of the view $V_{1,1}$ or $V_{2,1}$, the views $V_{1,1}$, $V_{2,1}$ not yet having been decoded. It is for example chosen to decode the view $V_{1,1}$. In this example, the decoding pathway for the current view $V_{3,4}$ determined from among several possible pathways therefore comprises, in the order of decoding to be implemented, the as yet undecoded views $V_{1,1}$, $V_{1,2}$ and $V_{2,3}$.

Once such a decoding pathway has been determined, the view $V_{1,1}$ is Intra decoded (represented by hatching in FIG. 8B). Once decoded, the view $V_{1,1}$ is stored in the memory MT_D2 of the decoder of FIG. 7B, with a view to being used for the decoding of next views. The view $V_{1,2}$ is thereafter decoded with reference to the previously decoded view $V_{1,1}$, and then is stored in the memory MT_D2 of the decoder of FIG. 7B, with a view to being used for the decoding of next views. The view $V_{2,3}$ is thereafter decoded with reference to the previously decoded view $V_{1,2}$, and then is stored in the memory MT_D2 of the decoder of FIG. 7B, with a view to being used for the decoding of next views. Finally, the view $V_{3,4}$ is decoded with reference to the previously decoded view $V_{2,3}$, and then is stored in the memory MT_D2 of the decoder of FIG. 7B, with a view to being used for the decoding of next views.

Thus, by virtue of the invention, only 4 views of the sequence need to be decoded in comparison with the 24 views (6 views of the multi-view image IMV$_1$, 6 views of the multi-view image IMV$_2$, 6 views of the multi-view image IMV$_3$ and 6 views of the multi-view image IMV$_4$) which are necessarily decoded by conventional decoders.

At the instant t4, the user's pathway of navigation from one view to another has thus necessitated the decoding of only 9 views in comparison with the 24 views which are necessarily decoded by conventional decoders.

In conjunction with the second embodiment of the decoding method of FIG. 6B, it has been observed that there exists a relation between the number of prediction residuals transmitted in the data signal F2 or F'2, which residuals depend on the coding method implemented, and the speed of change of views that the user will be able to apply.

For example, in the case of the decoding pathway of FIG. 8B according to which three different prediction residuals can be used alternately to reconstruct a current view $V_{u,j}$, the user has the possibility of navigating laterally from view to view, at each temporal instant.

A variant of the coding method of FIG. 6B may permit less flexibility, while remaining realistic from a practical point of view.

Figure 8C:
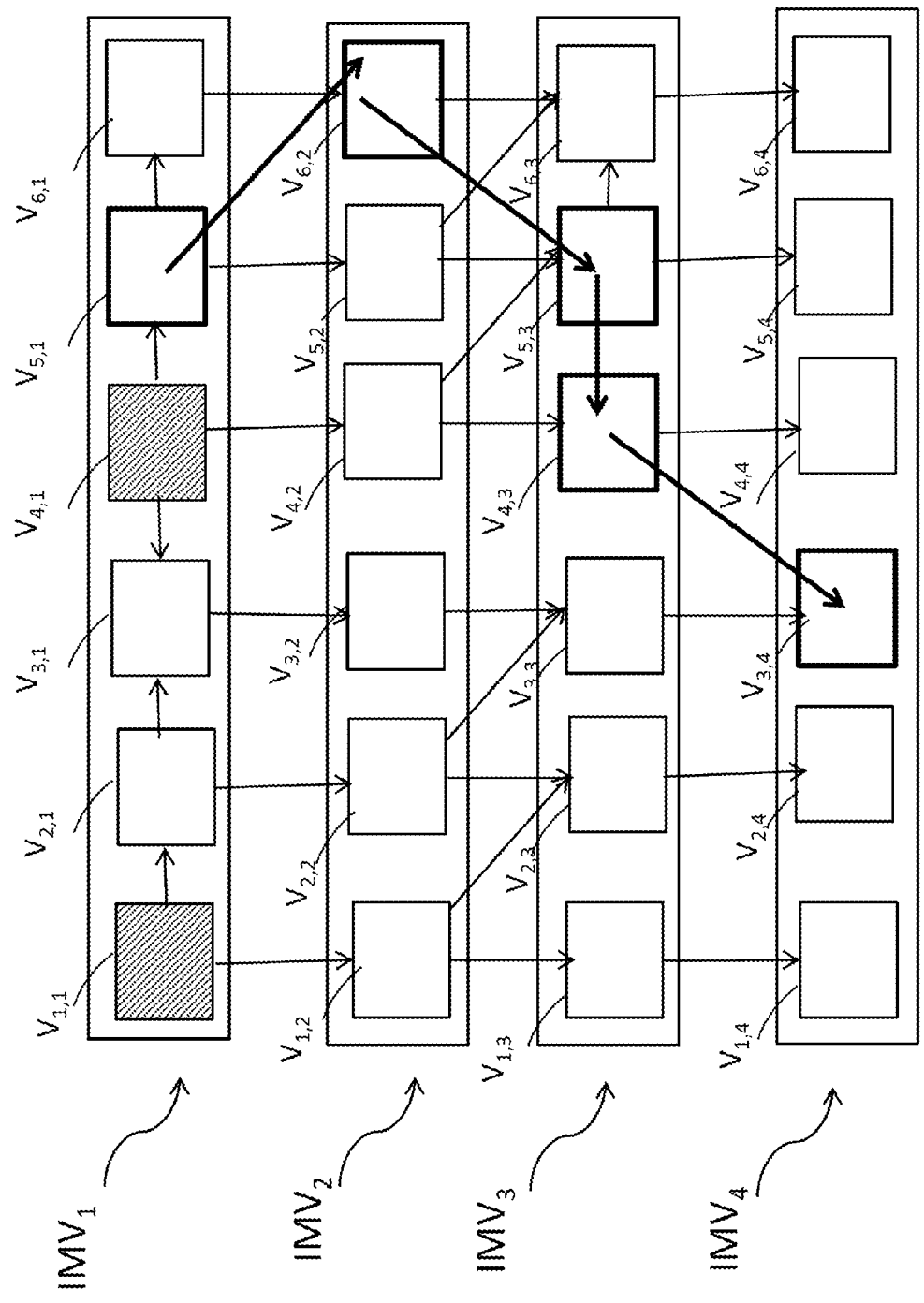
FIG. 8C represents a variant of the decoding pathway represented of FIG. 8B.

An exemplary decoding of at least one current view $V_{u,j}$ according to this variant is represented in FIG. 8C. In the example represented, if said at least one current view is the view $V_{2,4}$, a single prediction residual (symbolized by the arrow between the view $V_{2,3}$ and the view $V_{2,4}$) can be used to reconstruct this view, whilst in the preceding example of FIG. 8B, three different prediction residuals were able for example to be used alternately to reconstruct this view (symbolized respectively by the arrow between the view $V_{1,3}$ and the view $V_{2,4}$, the arrow between the view $V_{2,3}$ and the view $V_{2,4}$ and the arrow between the view $V_{3,3}$ and the view $V_{2,4}$).

Several different embodiments will now be described which are applied to the decoding pathway determination sub-step D21b) of the decoding method of FIG. 6B.

According to a first embodiment, if several decoding pathways for views necessary for the decoding of said at least one current view $V_{u,j}$ are possible, it is the pathway which contains the fewest possible additional views to be decoded which is selected.

Figure 8D:
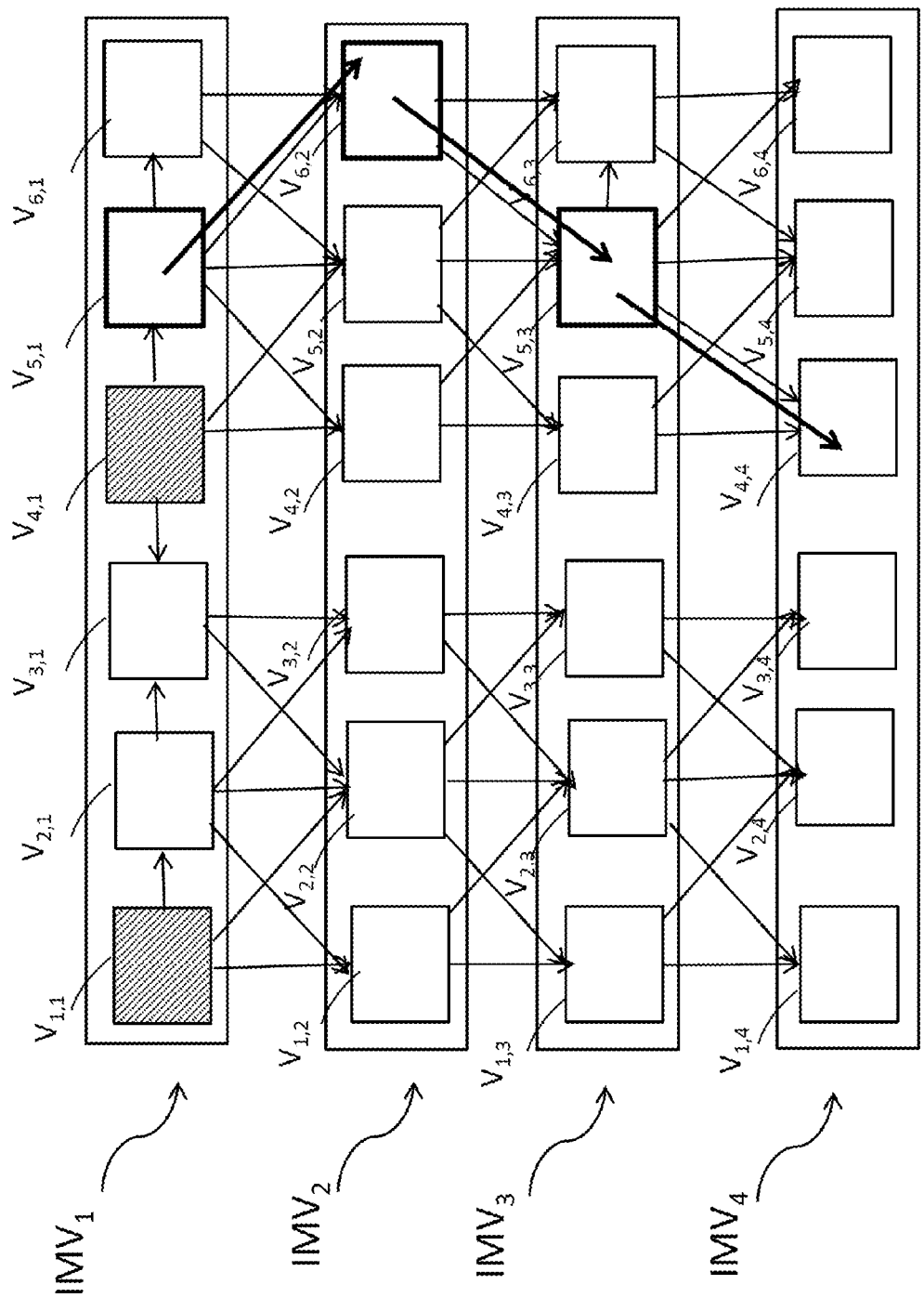
FIG. 8D represents an exemplary decoding pathway associated with the at least one current view to be decoded which contains a minimum number of views, the current view having been coded in accordance with one of the alternate coding trees of FIG. 5B.

In FIG. 8D is represented such an exemplary decoding for pathway at least one current view $V_{u,j}$, which has been coded with reference to FIG. 5B. In the example represented, each multi-view image comprises for example six views.

In the example represented, each current view considered is the one that a user chooses to request successively during his navigation from one view to another in the sequence of multi-view images IMV$_1$ to IMV$_4$. For example, these are views $V_{5,1}$, $V_{6,2}$, $V_{5,3}$, and then $V_{4,4}$. Such a navigation pathway is represented in bold in FIG. 8D.

Let us assume in this example that the views $V_{5,1}$, $V_{6,2}$, $V_{5,3}$ have been decoded in the same manner as in FIG. 8B and that the at least one current view to be decoded which is considered is for example the view $V_{4,4}$ that the user wishes to view. The decoding pathway for the view $V_{4,4}$ which uses a minimum number of additional views to be decoded is that which consists in decoding the current view $V_{4,4}$ directly on the basis of the view $V_{5,3}$, which has been viewed by the user at the previous instant t3 and has, therefore, already been decoded and therefore made available in the buffer memory MT_D2 of FIG. 7B.

Thus, in the case of the decoding of the current view $V_{4,4}$, the decoding pathway is highly optimized since it does not contain any additional view to be decoded.

An optimized decoding pathway such as this is determined by taking into account the views already decoded on the view to view navigation pathway already performed by the user, this being made possible having regard to the proposed decoding tree which can be selected from among several possible alternate trees.

According to a second embodiment, if several decoding pathways for views necessary for the decoding of the at least one current view $V_{u,j}$ are possible, it is the pathway for which the distance is minimized between at least one view which has been decoded without reference to other views and the at least one current view $V_{u,j}$ which is selected.

Returning to the example of FIG. 8D, the decoding pathway for the current view $V_{4,4}$ which uses a minimum distance between at least one view which has been decoded without reference to other views and the current view $V_{4,4}$ is that which consists in:
  decoding the view $V_{4,2}$ which has not yet been decoded, on the basis of the view $V_{4,1}$ which has already been Intra decoded during the viewing by the user of the view $V_{5,1}$,
  decoding the view $V_{4,3}$ which has not yet been decoded, on the basis of the view $V_{4,2}$,
  decoding the view $V_{4,4}$ on the basis of the view $V_{4,3}$.

Thus, by virtue of this second mode of determination of the decoding pathway for the current view $V_{4,4}$, the latter is separated from the Intra decoded view $V_{4,1}$ by only two views $V_{4,2}$ and $V_{4,3}$, while in the first mode of determination mentioned previously, the view $V_{4,4}$ was separated from the Intra decoded view $V_{4,1}$ by three views $V_{5,1}$, $V_{6,2}$ and $V_{5,3}$.

The second mode of determination which has just been described thus makes it possible to reduce the artifacts which tend to accumulate and to propagate during the decoding of one view with respect to the other in accordance with a non-intra prediction mode.

According to a third embodiment, not represented, if the pathway of views that are necessary for the decoding of said at least one current view, which has been determined on completion of sub-step D24a) of the decoding method of FIG. 6A or on completion of sub-step D21b) of the decoding method of FIG. 6B, does not make it possible to decode said at least one current view $V_{u,j}$ because of at least one decoding constraint, the at least one current view is replaced with another view of the multi-view image at the current instant tj, which is able to be decoded, said other view being the one spatially closest to the at least one current view.

It is indeed possible that during the determination of the pathway of views that are necessary for the decoding of said at least one current view, the decoder might not be able to decode the latter. Such a situation can for example occur when the decoder is subject to hardware constraints, such as in particular a maximum number $NB_{max}$ of views that are able to be decoded, and that the pathway of views that are necessary for the decoding of said at least one current view requires the decoding of a greater number of views than the number $NB_{max}$. The at least one current view will then be replaced with the view which is spatially closest to it and which is decodable in accordance with the constraints of the decoder.

According to a fourth embodiment, the pathway of views that are necessary for the decoding of said at least one current view $V_{u,j}$ which is determined during the aforementioned determination sub-step D24a) or D21b) contains a view on which there depends at least one view liable to be decoded at at least one instant which follows or which precedes the current instant tj.

Figure 8E:
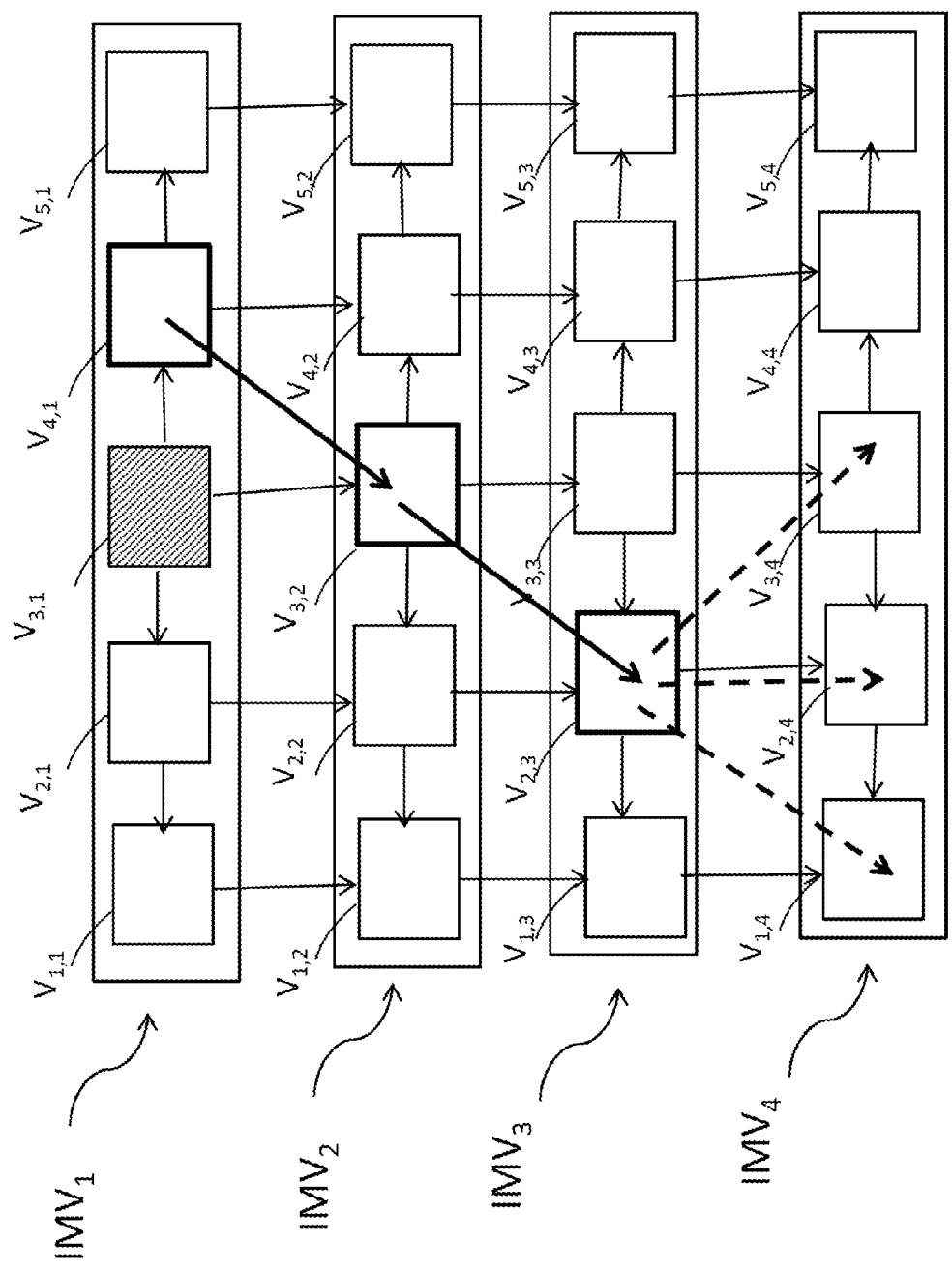
FIG. 8E represents an exemplary decoding pathway associated with the at least one current view to be decoded which takes account of the decoding of the view liable to be decoded at at least one instant following or preceding the current instant.

With reference now to FIG. 8E, there is represented an exemplary decoding of at least one current view $V_{u,j}$ such as coded in a manner similar to that represented in FIG. 5B (alternate decoding trees). In the example represented, the current multi-view image $IMV_j$ is the third image $IMV_3$ of a sequence of multi-view images, each multi-view image comprising for example five views. The at least one current view to be decoded which is considered in this example is for example the third view $V_{2,3}$ of the current multi-view image $IMV_3$.

In FIG. 8E, the image $V_{3,1}$ is intra decoded, this mode of decoding being represented by hatching. An exemplary pathway of navigation from one view to another is represented in bold in FIG. 8E. It contains, in order, the views $V_{4,1}$, $V_{3,2}$, $V_{2,3}$. Apart from these three views and the view $V_{3,1}$, all the other views represented have not yet been decoded.

To decode the current view $V_{2,3}$, the pathway of views that are necessary for the decoding of the latter consists in taking into account either the view $V_{2,2}$ which has not yet been decoded, or the view $V_{3,3}$ which likewise has not yet been decoded. In order to make a choice between these two views, there is analyzed the impact of the decoding of each of them during the viewing, and therefore the decoding, of a view liable to be requested by the user at at least one instant following or preceding the current instant t3. It is assumed, in the example represented, that this is the instant t4 which immediately follows the following instant t3. As a variant, the user might wish to view a view at an instant preceding the current instant t3, the instant t1 for example.

Three different navigation pathways represented dashed in FIG. 8E can be envisaged when a view at the following instant t4 is requested on the basis of the last decoded current view $V_{2,3}$:
  if the view $V_{1,4}$ is requested, then to decode this view it is necessary either to decode the view $V_{1,3}$ or to decode the view $V_{2,4}$, the views $V_{1,3}$ and $V_{2,4}$ both being decoded on the basis of the view $V_{2,3}$ which has itself already been decoded previously on the user's navigation pathway and which is available in the buffer memory of the decoder,
  if the view $V_{2,4}$ is requested, the view $V_{2,4}$ is decoded directly on the basis of the view $V_{2,3}$ which has itself already been decoded previously on the user's navigation pathway and which is available in the buffer memory of the decoder,
  if the view $V_{3,4}$ is requested, it is necessary to decode the view $V_{3,3}$ on the basis of the view $V_{3,2}$ which has itself already been decoded previously on the user's navigation pathway and which is available in the buffer memory of the decoder.

The first and third pathways hereinabove involving an additional decoding of views, it is the second pathway which is selected.

In a variant of this fourth embodiment, the determination of the pathway of views that is necessary for the decoding of said at least one current view is implemented by calculating the probability that this or that view at at least one instant following or preceding the current instant is requested to be decoded. Such a calculation can be determined as a function of the statistics related to the way in which the user navigates in the sequence of multi-view images. A probability model for the user's choices of views can be predefined or else be initialized equiprobably and updated continually in the course of the decoding. The selected pathway will then be that which "has the most chance" of being optimal thereafter, that is to say for example due to the fact of containing a minimum number of additional views to be decoded so as to decode said at least one current view. Another way of predicting that this or that view at at least one instant following or preceding the current instant is requested to be decoded consists in anticipating the fact that the user retains the same direction of displacement between two consecutively viewed views, these two views being able to be situated at the same instant or at two different instants.

The optimization of the pathway of views that are necessary for the decoding of said at least one current view can, according to the decoding context, be implemented:
  according to one of the various modes of pathway determination which have just been described,
  or else according to a combination of these various modes,
  or else successively according to a predefined order of priority.

In the case where a combination of the various modes of pathway determination is envisaged, a priority will have to be given to each of them. For example, to improve the quality of a decoded view, the optimization of the pathway will be done as a priority by assessing the smallest distance between the at least one current view to be decoded and a view of the sequence of multi-view images which has been intra decoded. In another example, to reduce the complexity at the decoder, priority will be given to minimizing the number of views to be decoded. According to yet another example, in the case of an embodiment similar to the aforementioned variant of the fourth embodiment where the future displacements of the user are anticipated, by admitting that several different navigation pathways can be envisaged when a view at the following instant t4 is requested on the basis of the last decoded current view $V_{2,3}$ and that two decoding pathways are determined as being optimal, with the same number of additional views to be decoded, one of these two optimal pathways is ultimately selected by determining the optimal decoding pathway at an instant following or preceding the instant t4.

In the case where the various modes of pathway determination comply with an order of priority, when two pathways of views are both considered optimal subsequent to the implementation of a first mode of priority determination, the second mode of priority determination is then selected.

In accordance with another embodiment:
  a step D10a) of managing the buffer memory MT_D1 of FIG. 7A is implemented in the decoding method of FIG. 6A, before the step D2a) of decoding said at least one current view $V_{u,j}$,
  and/or a step D10b) of managing the buffer memory MT_D2 of FIG. 7B is implemented in the decoding method of FIG. 6B, before the step D2b) of decoding said at least one current view $V_{u,j}$.

Step D10a) is implemented by a management device MG_D1 represented in FIG. 7A.

Step D10b) is implemented by a management device MG_D2 represented in FIG. 7B.

These steps being optional, they are represented dashed in FIGS. 6A and 6B.

According to the invention, in the course of the management step D10a) or D10b), the buffer memory is updated:
  as a function of the temporal distance which separates the already decoded views, which are stored in the buffer memory, from said at least one current view to be decoded,
  and/or when all the views of a multi-view image preceding the current multi-view image $IMV_j$ have been decoded.

Such an arrangement advantageously makes it possible to economize on the resources of the buffer memory MT_D1 or MT_D2 which are limited. It makes it possible furthermore to have buffer memories desynchronized between the coder and the decoder, such a desynchronization being made possible by virtue of the implementation of the step of determining the pathway of views that are necessary for the decoding of said at least one current view and the decoding of the view or views not yet decoded which have been charted on the pathway determined.

According to a first example, the views stored furthest from the at least one current view will be the first to leave the buffer memory. According to a second example, if all the views of a multi-view image have already been decoded, they automatically leave the buffer memory.

It goes without saying that the embodiments which have been described hereinabove were given purely by way of wholly non-limiting indication, and that numerous modifications can easily be made by the person skilled in the art without however departing from the scope of the invention

The invention claimed is:

1. A decoding method comprising the following acts performed by a decoding device:
  decoding at least one current view belonging to a multi-view image which has been previously coded, said at least one current view representing a given perspective of a scene, wherein the decoding comprises:
    determining, in a data signal or in another data signal representative of another multi-view image, coding data of at least one view which is necessary for the decoding of said at least one current view and which constitutes a view situated on at least one pathway of views necessary for the decoding of said at least one current view, said at least one view necessary for the decoding of said at least one current view being not yet decoded and not available at the time of said decoding,
    decoding said at least one view necessary for the decoding of said at least one current view, independently or else with respect to at least one other view already decoded or not, by using said coding data,
    determining in said data signal:
      first coded data representative of a difference between said at least one current view and a first view of said multi-view image or of another multi-view image,
      at least second coded data representative of a difference between said at least one current view and a second view of said multi-view image or of another multi-view image,
    selecting either said first coded data, or said at least second coded data,
    decoding the first or the at least second coded data selected, and
    decoding said at least one current view on the basis of said at least one decoded view necessary for the decoding of said at least one current view and on the basis of the first or of the at least second coded data decoded.

2. The decoding method as claimed in claim 1, comprising a determination of said at least one pathway by reading, in the data signal, information representative of said at least one pathway.

3. The decoding method as claimed in claim 2, in which the determination of said at least one pathway of views that are necessary for the decoding of said at least one current view is implemented according to a criterion for minimizing a number of views situated on said at least one pathway.

4. The decoding method as claimed in claim 2, in which the determination of said at least one pathway of views that are necessary for the decoding of said at least one current view is implemented according to a criterion for minimizing the distance between at least one view which has been decoded without reference to other views and said at least one current view.

5. The decoding method as claimed in claim 2, in which said at least one determined pathway contains a view on which there depends at least one view liable to be decoded at at least one instant which follows or which precedes the current instant.

6. The decoding method as claimed in claim 2, in which the determination of said at least one pathway is implemented by estimating, with the aid of a probability calculation, at least one view liable to be decoded at at least one instant which follows or which precedes the current instant.

7. The decoding method as claimed in claim 1, in which when said at least one pathway of views that are necessary for the decoding of said at least one current view does not make it possible to decode said at least one current view because of at least one decoding constraint, said decoding device replaces at least one current view with another view of the multi-view image at the current instant, which is able to be decoded, said other view being the one spatially closest to said at least one current view.

8. The decoding method as claimed in claim 1, further comprising storing the decoded and available views in a non-transitory computer-readable medium, said medium being updated as a function of the temporal distance which separate the decoded and available views from said at least one current view to be decoded or else when all the views of a multi-view image preceding the multi-view image at the current instant are decoded.

9. A decoding device comprising:
a processing circuit; and
a non-transitory computer-readable medium comprising instructions stored thereon, which when executed by the processing circuit configures the decoding device to perform acts comprising:
decoding at least one current view belonging to a multi-view image which has been previously coded, said at least one current view representing a given perspective of a scene, the decoding comprising:
determining, in said data signal or in another data signal representative of another multi-view image, coding data of at least one view which is necessary for the decoding of said at least one current view and which constitutes a view situated on at least one pathway of views necessary for the decoding of said at least one current view, said at least one view necessary for the decoding of said at least one current view being not yet decoded and not available at the time of said decoding,
decoding said at least one view necessary for the decoding of said at least one current view, independently or else with respect to at least one other view already decoded or not, by using said coding data,
determining in said data signal:
first coded data representative of a difference between said at least one current view and a first view of said multi-view image or of another multi-view image,
at least second coded data representative of a difference between said at least one current view and a second view of said multi-view image or of another multi-view image,
selecting either said first coded data, or said at least second coded data,
decoding the first or the at least second coded data selected, and
decoding said at least one current view on the basis of said at least one decoded view necessary for the decoding of said at least one current view and on the basis of the first or of the at least second coded data decoded.

10. A non-transitory computer-readable recording medium on which is recorded a computer program comprising program code instructions for execution of a decoding method, when the instructions are executed on a processing circuit of a decoding device, wherein the instructions configure the decoding device to perform acts comprising:
decoding at least one current view belonging to a multi-view image which has been previously coded, said at least one current view representing a given perspective of a scene, wherein the decoding comprises:
determining, in said data signal or in another data signal representative of another multi-view image, coding data of at least one view which is necessary for the decoding of said at least one current view and which constitutes a view situated on at least one pathway of views necessary for the decoding of said at least one current view, said at least one view necessary for the decoding of said at least one current view being not yet decoded and not available at the time of said decoding,
decoding said at least one view necessary for the decoding of said at least one current view, independently or else with respect to at least one other view already decoded or not, by using said coding data,
determining in said data signal:
first coded data representative of a difference between said at least one current view and a first view of said multi-view image or of another multi-view image,
at least second coded data representative of a difference between said at least one current view and a second view of said multi-view image or of another multi-view image,
selecting either said first coded data, or said at least second coded data,
decoding the first or the at least second coded data selected, and
decoding said at least one current view on the basis of said at least one decoded view necessary for the decoding of said at least one current view and on the basis of the first or of the at least second coded data decoded.

11. A coding method comprising the following acts performed by a coding device:
coding at least one multi-view image by coding at least one current view of said at least one multi-view image, said at least one current view representing a given perspective of a scene, wherein the coding comprises:
performing a first prediction of said at least one current view with respect to a first view of said multi-view image or of another multi-view image, delivering a first set of predicted data,
performing at least one second prediction of said at least one current view with respect to a second view of said multi-view image or of another multi-view image, delivering at least one second set of predicted data,
coding said first set of predicted data and said at least one second set of predicted data,
coding at least one view which is necessary for the coding and the decoding of said at least one current view and which constitutes a view situated on at least one pathway of views necessary for the coding and the decoding of said at least one current view, said at least one view necessary for the coding and the decoding of said at least one current view being not yet decoded and not available at the time of decoding of said at least one current view, said at least one current view necessary for the coding and the decoding of said at least one current view being itself coded independently or else with respect to at least one other view already decoded or not decoded, said coding of at least one view which is necessary for the coding and the decoding of said at least one current view providing coding data of said at least one view necessary for the coding and the decoding of said at least one current view,
generating a data signal comprising said coded first set of predicted data and said at least one coded second set of predicted data,
transmitting said generated data signal over a communication network; and,
transmitting said coding data associated with of said at least one view necessary for the coding and the decoding of said at least one current view over a communication network in said data signal or in another data signal representative of another multi-view image.

12. A coding device comprising:
a processing circuit; and
a non-transitory computer-readable medium comprising instructions stored thereon, which when executed by the processing circuit configures the coding device to perform acts comprising:
coding at least one multi-view image by coding at least one current view of said at least one multi-view image, said at least one current view representing a given perspective of a scene, said coding comprising:

performing a first prediction of said at least one current view with respect to a first view of said multi-view image or of another multi-view image, delivering a first set of predicted data, performing at least one second prediction of said at least one current view with respect to a second view of said multi-view image or of another multi-view image, delivering at least one second set of predicted data, coding said first set of predicted data and said at least one second set of predicted data, coding at least one view which is necessary for the coding and the decoding of said at least one current view and which constitutes a view situated on at least one pathway of views necessary for the coding and the decoding of said at least one current view, said at least one view necessary for the coding and the decoding of said at least one current view being not yet decoded and not available at the time of decoding of said at least one current view, said at least one current view necessary for the coding and the decoding of said at least one current view being itself coded independently or else with respect to at least one other view already decoded or not decoded, said coding of at least one view which is necessary for the coding and the decoding of said at least one current view providing coding data of said at least one view necessary for the coding and the decoding of said at least one current view, generating a data signal comprising said coded first set of predicted data and said at least one coded second set of predicted data, transmitting said generated data signal over a communication network; and transmitting said coding data of said at least one view necessary for the coding and the decoding of said at least one current view over a communication network in said data signal or in another data signal representative of another multi-view image.

13. A non-transitory computer-readable recording medium on which is recorded a computer program comprising program code instructions for execution of a coding method, when the instructions are executed on processing circuit of a coding device, wherein the instructions configure the coding device to perform acts comprising:

coding at least one multi-view image by coding at least one current view of said at least one multi-view image, said at least one current view representing a given perspective of a scene, wherein the coding comprises:

performing a first prediction of said at least one current view with respect to a first view of said multi-view image or of another multi-view image, delivering a first set of predicted data, performing at least one second prediction of said at least one current view with respect to a second view of said multi-view image or of another multi-view image, delivering at least one second set of predicted data, coding said first set of predicted data and said at least one second set of predicted data, coding at least one view which is necessary for the coding and the decoding of said at least one current view and which constitutes a view situated on at least one pathway of views necessary for the coding and the decoding of said at least one current view, said at least one view necessary for the coding and the decoding of said at least one current view being not yet decoded and not available at the time of decoding of said at least one current view, said at least one current view necessary for the coding and the decoding of said at least one current view being itself coded independently or else with respect to at least one other view already decoded or not decoded, said coding of at least one view which is necessary for the coding and the decoding of said at least one current view providing coding data of said at least one view necessary for the coding and the decoding of said at least one current view, generating a data signal comprising said coded first set of predicted data and said at least one coded second set of predicted data, transmitting said generated data signal over a communication network; and, transmitting said coding data of said at least one view necessary for the coding and the decoding of said at least one current view over a communication network in said data signal or in another data signal representative of another multi-view image.

* * * * *